United States Patent
Kozhikkottu et al.

(10) Patent No.: US 10,853,300 B2
(45) Date of Patent: Dec. 1, 2020

(54) LOW LATENCY STATISTICAL DATA BUS INVERSION FOR ENERGY REDUCTION

(71) Applicant: Intel Corporation, Santa Clara, CA (US)

(72) Inventors: Vivek Kozhikkottu, Hillsboro, OR (US); Shankar Ganesh Ramasubramanian, Hillsboro, OR (US); Kon-Woo Kwon, Beaverton, OR (US); Dinesh Somasekhar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 715 days.

(21) Appl. No.: 15/475,571

(22) Filed: Mar. 31, 2017

(65) Prior Publication Data
US 2018/0285304 A1    Oct. 4, 2018

(51) Int. Cl.
*G06F 13/42*      (2006.01)
*G06F 13/36*      (2006.01)
*G06F 13/40*      (2006.01)

(52) U.S. Cl.
CPC ............ *G06F 13/42* (2013.01); *G06F 13/36* (2013.01); *G06F 13/4068* (2013.01); *Y02D 10/14* (2018.01); *Y02D 10/151* (2018.01)

(58) Field of Classification Search
CPC ....... G06F 13/42; G06F 13/36; G06F 13/4068
See application file for complete search history.

(56) References Cited

U.S. PATENT DOCUMENTS

| | | | | |
|---|---|---|---|---|
| 7,522,073 B1* | 4/2009 | Kao | ............ | H03M 5/145 341/55 |
| 2008/0309523 A1* | 12/2008 | Lee | ............ | G11C 7/02 341/55 |
| 2009/0077286 A1* | 3/2009 | Bertram | ............ | G06F 13/4072 710/100 |
| 2010/0026533 A1* | 2/2010 | Hollis | ............ | H03M 5/00 341/58 |
| 2016/0019179 A1* | 1/2016 | Loke | ............ | G06F 13/4072 341/58 |
| 2016/0162434 A1* | 6/2016 | Mozak | ............ | G06F 13/1657 710/106 |
| 2018/0143922 A1* | 5/2018 | Hong | ............ | G11C 7/222 |

* cited by examiner

*Primary Examiner* — Tim T Vo
*Assistant Examiner* — Phong H Dang
(74) *Attorney, Agent, or Firm* — Schwabe, Williamson & Wyatt, P.C.

(57) ABSTRACT

In accordance with embodiments disclosed herein, there is provided systems and methods for low latency statistical data bus inversion (DBI) for energy reduction. A transmitting component includes a transmitter and a statistical DBI circuit. The statistical DBI circuit is to receive current data to be transmitted on a data bus and is to store previous data transmitted on the data bus. The statistical DBI circuit includes inverting logic to invert bits of the current data before transmission in response to a control signal. The statistical DBI circuit includes adjacent pattern prediction logic to receive a difference vector including a comparison of the previous data and the current data, determine whether the difference vector includes a pattern predicting transmission of the current data with toggle is more efficient than without toggle, and output the control signal in the first state indicating the pattern was detected.

18 Claims, 9 Drawing Sheets

LOW LATENCY STATISTICAL DATA BUS INVERSION FOR ENERGY REDUCTION

DESCRIPTION OF EMBODIMENTS

Figure 1A:
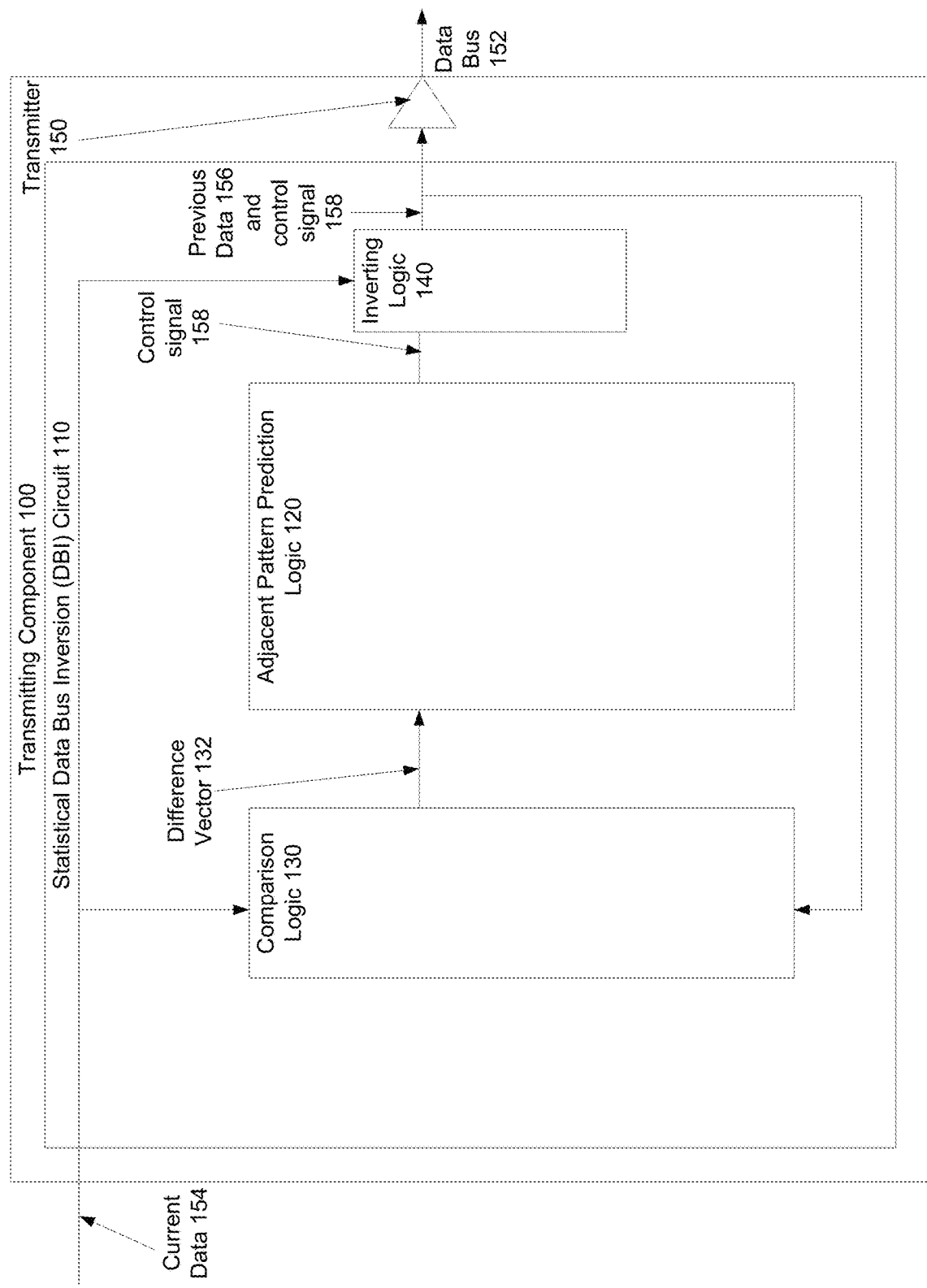
FIG. 1A illustrates a transmitting component including a statistical data bus inversion (DBI) circuit that includes adjacent pattern prediction logic, according to certain embodiments.

Data bus inversion (DBI) techniques use an extra bit (e.g., a DBI bit, a control signal) to indicate whether current data is to be transmitted over a data bus with toggle (e.g., inverted, switching 0s and 1s) or without toggle (e.g., without inverting, as received). Inverting the current data for transmitting may lower the amount of toggling between previous data transferred and current data that is to be transferred. The decision to invert the current data is based on the number of toggles that would be caused by transmitting the current data and is determined by comparing the current data to the previous data transmitted on the data bus (e.g., if the previous data is all is and the current data is all 0s, the current data can be inverted to all is to avoid toggling between previous data and current data). In one example, a DBI population count technique uses a population count circuit to determine if greater than half of the number of bits are toggling (e.g., 5 bits are toggling on a 9 bit data bus) and this technique can save, on average for random data, 18% energy for a 8/9 encoding scheme (eight bits are transmitted in addition to one bit indicating whether the data is inverted or not). The population count circuit has high latency (e.g., the population count circuit consumes about 180 picoseconds (ps) (out of a total of 250 ps) when synthesized in a 14 nanometer (nm) process). This high latency rules out the use of the DBI population count technique for most on-chip buses where latency is critical. The problem is more compounded in large network on-chip buses where which port won arbitration to the common data bus is not typically known beforehand (e.g., only one cycle in advance). If the DBI population count technique is applied on a network, only 50-75% of intended distance (depending on the data rate of the bus) may be traversed. Even though energy savings are high, the DBI population count technique is not widely utilized because of the large latency addition (e.g., in an encoding process).

The devices, systems, and methods, as disclosed herein, provide low latency statistical DBI for energy reduction (e.g., via a statistical DBI circuit). The low latency statistical DBI may be used for encoding circuits and may save energy while being significantly lower in circuit delay (e.g., latency) and at the same time reducing overhead of the encoding circuits.

The DBI encoding process can be approximated by using the low latency statistical DBI. There is no change in functional correctness whether current data is transmitted as received (e.g., not inverted) or as an inverted version, but there is a difference in the amount of power consumed. The low latency statistical DBI approximates DBI functionality to make the correct decision for most of the cases (e.g., cases with the most reductions in toggles) while the delay is significantly lowered (e.g., by using simple AND-OR pattern detectors).

The existence of certain patterns (e.g., series of adjacent bits in a difference vector are one) is a good predictor that the majority of bits in the current data are also one. The simple pattern detectors can be realized in a low latency manner using simple one/two patterns of logic gates. One or more pattern predictors may be used to achieve a tradeoff between achievable energy savings and encoding latency. The present disclosure presents examples of predictors, but various combinations of similar types of and/or other types of predictors may also be used.

The lower latency statistical DBI may include circuitry (e.g., statistical DBI circuit) that is simpler than the population count circuitry and that has been optimized for latency while making small errors in the majority decision. For example, an incorrect population count that results when 5 of 9 bits are high (e.g., value of one) and causes 1 extra toggle than the ideal, whereas an incorrect majority decision when 9 bits are high causes 5 extra toggles. The lower latency statistical DBI makes errors that are less expensive from an energy standpoint (e.g., 1 extra toggle instead of 5 extra toggles) and has a simplified circuit that thereby has energy savings and low latency.

FIG. 1A illustrates a transmitting component 100 including a statistical DBI circuit 110 that includes adjacent pattern prediction logic 120, according to certain embodiments. The statistical DBI circuit 110 may also include comparison logic 130 and inverting logic 140. The adjacent pattern prediction logic 120 may be coupled to the comparison logic 130 and the inverting logic 140. The transmitting component 100 may also include a transmitter 150 coupled to a data bus 152 and to the statistical DBI circuit 110.

The statistical DBI circuit 110 receives current data 154 (e.g., at comparison logic 130 and inverting logic 140) to be transmitted on the data bus 152. Current data 154 that has been processed by the comparison logic 130, the adjacent pattern prediction logic 120, and the inverting logic 140 may be referred to as previous data 156. Current data 154 that has been transmitted on the data bus 152 may be referred to as previous data 156. The previous data 156 includes a plurality of previous bits 157 that correspond to a plurality of current bits 155 of the current data 154 (see FIGS. 1B-E).

The comparison logic 130 receives current data 154 and previous data 156. The comparison logic 130 generates a difference vector 132 that includes a comparison of the previous data 156 and the current data 154. The difference vector 132 may include a plurality of bits 133, each of the plurality of bits 133 including a corresponding comparison of a previous value of a corresponding previous bit 157 and a current value of a corresponding current bit 155 of the current data 154 (see FIGS. 1B-E).

The adjacent pattern prediction logic 120 receives the difference vector 132, determines whether the difference vector 132 includes a pattern predicting transmission of the current data 154 with toggle is more efficient than transmission of the current data 154 without toggle, and output a control signal 158.

The adjacent pattern prediction logic 120 may detect the existence of certain patterns (e.g., series of adjacent bits in a difference vector are one) that are a good predictor that the majority of bits in the current data are also one. One pattern predictor or a combination of pattern predictors may be used to achieve a tradeoff between achievable energy savings and encoding latency. The present disclosure presents examples of predictors (see FIGS. 1B-E), but various combinations of similar types of and/or other types of predictors may also be used.

Figure 1B:
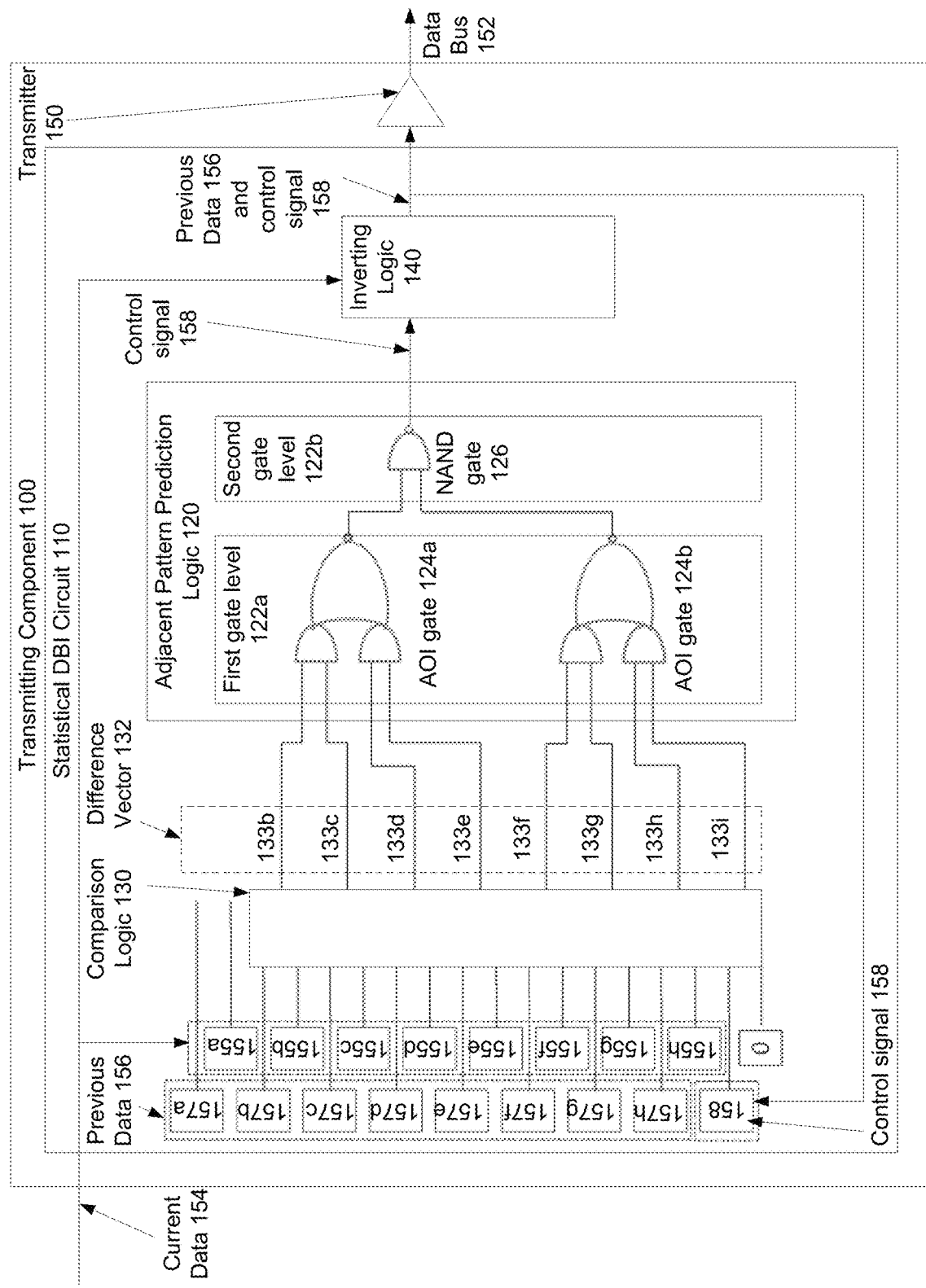
FIG. 1B illustrates a transmitting component including a statistical DBI circuit that includes adjacent pattern prediction logic, according to certain embodiments.
Figure 1C:
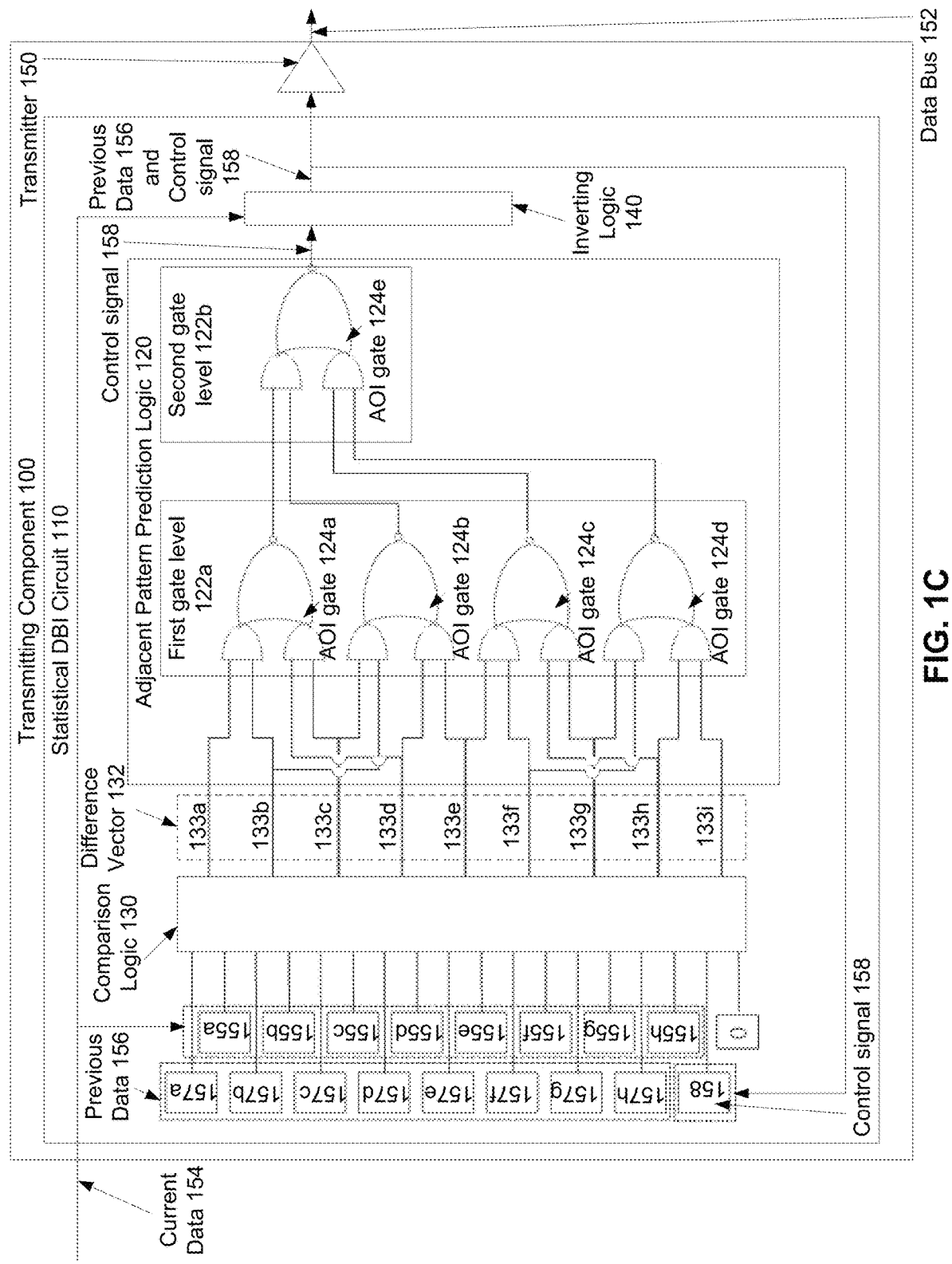
FIG. 1C illustrates a transmitting component including a statistical DBI circuit that includes adjacent pattern prediction logic, according to certain embodiments.
Figure 1D:
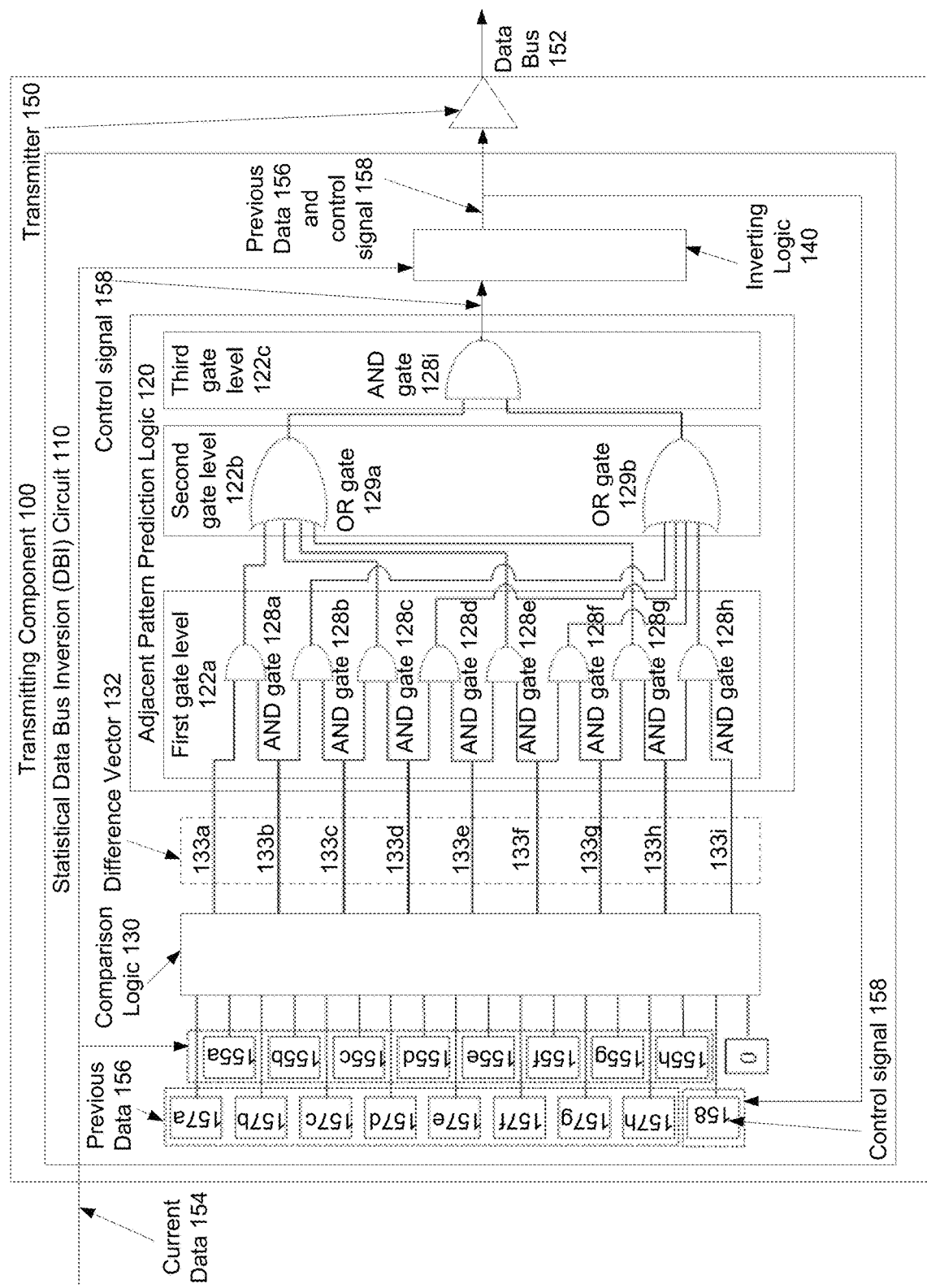
FIG. 1D illustrates a transmitting component including a statistical DBI circuit that includes adjacent pattern prediction logic, according to certain embodiments.
Figure 1E:
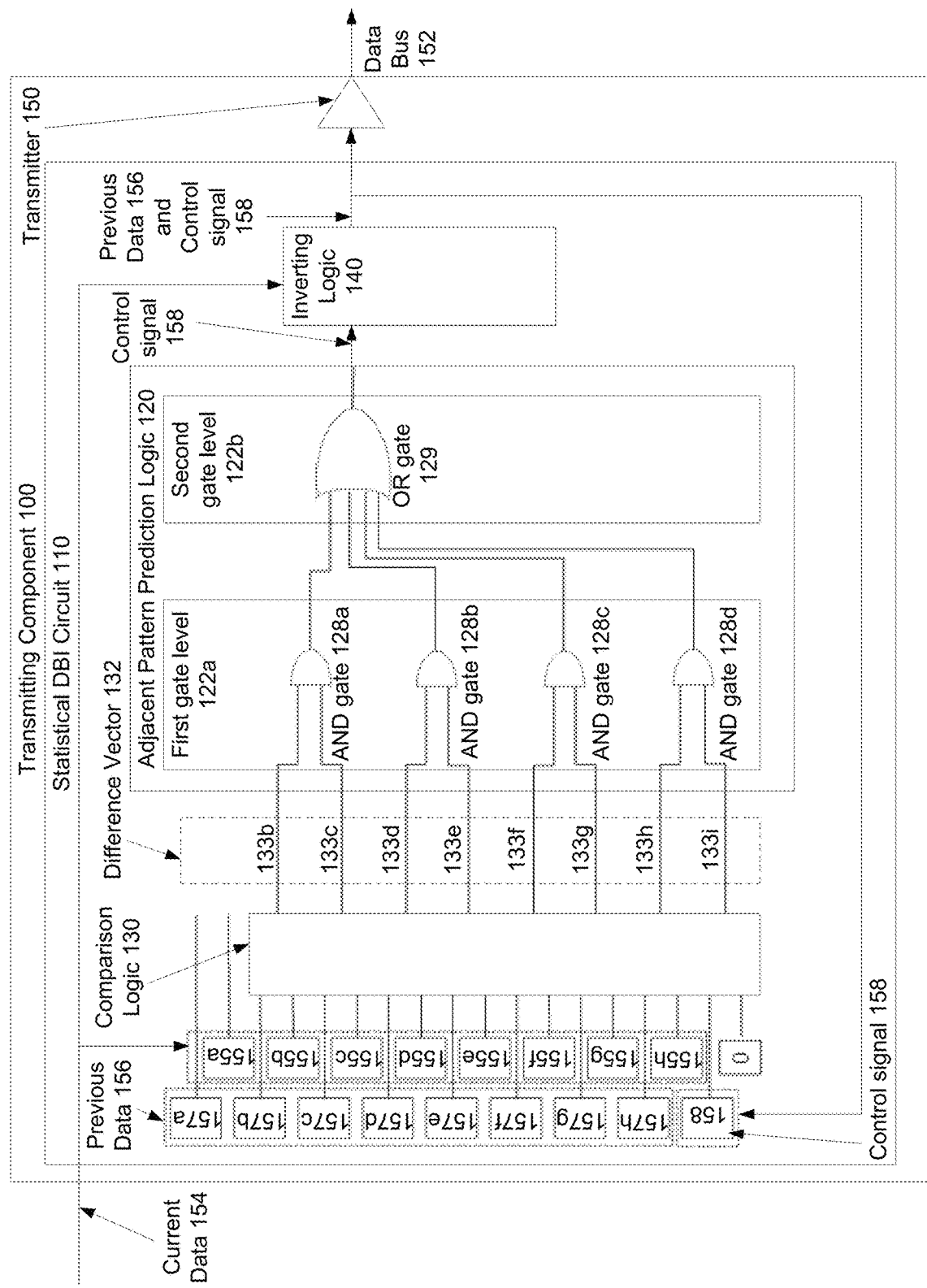
FIG. 1E illustrates a transmitting component including a statistical DBI circuit that includes adjacent pattern prediction logic, according to certain embodiments.

The pattern may include at least two bits 133 of the difference vector 132 indicating the corresponding previous bit 157 and the corresponding current bit 155 are not equal (see FIGS. 1B and 1E). In certain embodiments, the pattern may include at least three bits 133 of the difference vector 132 indicating the corresponding previous bit 157 and the corresponding current bit 155 are not equal (see FIG. 1C). In certain embodiments, the pattern may include at least four bits 133 of the difference vector 132 indicating the corresponding previous bit 157 and the corresponding current bit 155 are not equal (see FIG. 1D). In certain embodiments, the adjacent pattern prediction logic 120 includes a two-level predictor (two gate levels 122) that divides nine bits 133 into groups of three and the pattern is any two of the groups have greater than 2 bits indicating the corresponding bits 155 and 157 are not the same (e.g., have a value of one). In certain embodiments, the bits are consecutive bits. In certain embodiments, one or more other patterns may be used.

The adjacent pattern prediction logic 120 may output a control signal 158 to indicate whether the current data 154 is to be transmitted with or without toggle. The control signal 158 in the first state indicates current data 154 is to be transmitted with toggle in response to the pattern being detected by the adjacent pattern prediction logic 120. The control signal 158 in a second state indicates the current data 154 is to be transmitted without toggle in response to the pattern not being detected by the adjacent pattern prediction logic 120.

The inverting logic 140 may invert bits 155 of the current data 154 before transmission in response to a control signal 158 in a first state and may not invert bits 155 of the current data 154 before transmission in response to a control signal 158 in a second state.

The transmitter 150 may transmit the current data 154 after being processed by the statistical DBI circuit 110 (e.g., previous data 156 and control signal 158) via a data bus 152. In certain embodiments, the transmitting component 100 is a pre-driver. In certain embodiments, the transmitting component 100 is to transmit the current data 154 (e.g., previous data 156 and control signal 158) via wireless communication.

The transmitting component 100 may be part of a computing system that includes a memory device, a processor coupled to the memory device, and a network card coupled to the processor. The network card may include a pre-driver circuit (e.g., transmitting component 100) and a driver circuit coupled to the pre-driver circuit. The pre-driver circuit (e.g., transmitting component 100) may receive current data 154 to be transmitted on a data bus 152, store previous data 156 transmitted on the data bus 152, determine a comparison of the previous data 156 and the current data 154 includes a pattern predicting transmission of the current data 154 with toggle is more efficient than transmission of the current data 154 without toggle, and invert bits of the current data 154 before transmission in response to determining the comparison includes the pattern. The driver circuit may output the current data 154.

The comparison logic 130, adjacent pattern prediction logic 120, and inverting logic 140 may include one or more logic gates for comparing current data 154 with previous data 156, predicting transmission of the current data 154 with toggle is more efficient than transmission of the current data 154 without toggle, and inverting the current data 154. Examples of logic gates are described in conjunction with FIGS. 1B-1E. It is understood that other types of logic gates, other numbers of logic gates, and other combinations of logic gates could also be used. The present disclosure is not limited to the specific examples that are illustrated.

The statistical DBI including comparison logic 130, adjacent pattern prediction logic 120, and inverting logic 140 may be implemented in hardware, software, or a combination thereof. The transmitting component 100 may be part of a network card which is coupled to a processor that is coupled to a memory device, where a computer system includes the memory device, processor, and network card.

FIG. 1B illustrates a transmitting component 100 including a statistical DBI circuit 110 that includes adjacent pattern prediction logic 120, according to certain embodiments.

In certain embodiments, the current data 154 may include 8 bits 155 (e.g., a plurality of current bits 155) and the previous data 156 may include 8 bits 157 (e.g., a plurality of previous bits 157). Each of the bits 155 of current data 154 may correspond to a corresponding bit 157 of the previous data 156. The control signal 158 may be added as an additional bit to the previous data 156, increasing the number of bits 157 of the previous data 156 to 9 bits (e.g., increasing from x to x+1). An additional bit (e.g., with a value of zero) may be added to the current data 154 to correspond to the control signal 158, increasing the number of bits 155 of the current data 154 to 9 bits. The comparison logic 130 may receive eight of the nine bits of the current data 154 and eight of the nine bits of the previous data 156.

The comparison logic 130 generates a difference vector 132 including a plurality of bits 133. Each bit 133 may be a comparison of a corresponding bit 157 and bit 155. In one embodiment, the comparison logic 130 includes a plurality of Exclusive OR (XOR) gates. The plurality of XOR gates may include eight XOR gates. A corresponding bit 155 of the current data 154 and a corresponding bit 157 of the previous data 156 may be received by each of the corresponding XOR gates. One or more corresponding bits 155 of the current data 154 and one or more corresponding bits 157 of the previous data 156 may not be received by the comparison logic 130. In one embodiment, the one or more corresponding bits of the current data 154 and the previous data 156 not received include the control signal 158 and the additional bit of current data 154. In another embodiment, the one or more corresponding bits of the current data 154 and the previous data 156 not received are not the control signal 158 and the additional bit of current data 154.

Each XOR gate of the comparison logic 130 may have two inputs and may generate an output per the following XOR gate truth table:

| First input | Second input | Output |
|---|---|---|
| 0 | 0 | 0 |
| 0 | 1 | 1 |
| 1 | 0 | 1 |
| 1 | 1 | 0 |

If the corresponding bit 155 of the current data 154 and the corresponding bit 157 of the previous data 156 do not have the same value (e.g., toggle, do not match), then a first type of bit value (e.g., one) may be output as a bit 133 by the XOR gate for inclusion in the difference vector 132. If the corresponding bit 155 of the current data 154 and the corresponding bit 157 of the previous data 156 have the same value (e.g., match, do not toggle), then a second type of bit value (e.g., zero) may be output as bit 133 by the XOR gate for inclusion in the difference vector 132.

The comparison logic 130 generates a difference vector 132 including bits 133 output from the eight outputs of the comparison, each of which correspond to one of the eight XOR gates. In another embodiment, comparison logic 130 uses a different type of logic gate (e.g., eight Exclusive NOR (XNOR) gates).

The comparison logic 130 may be coupled to the adjacent pattern prediction logic 120. The adjacent pattern prediction logic 120 receives the difference vector 132. The adjacent pattern prediction logic 120 may determine whether two consecutive bits 133 in the difference vector 132 are ones (e.g., indicate the corresponding bit 157 of previous data 156 and the corresponding bit 155 of current data 154 are not the same). The adjacent pattern prediction logic 120 may look for a pattern in a hamming distance vector.

The adjacent pattern prediction logic 120 may break the difference vector 132 into four groups of two bits 133 and if both bits 133, in one of the groups, are one, the adjacent pattern prediction logic 120 predicts that the total number of bits 133 in the difference vector 132 is greater than four that indicate corresponding bits 155 and 155 do not match.

In one example, the statistical DBI circuit 110 in FIG. 1B may save about 9% energy (e.g., toggles) compared to 18.3% for a population count DBI and the statistical DBI circuit 110 in FIG. 1B may have about 93 picoseconds of latency and about 9.78 square micrometers ($\mu m^2$) of area which is 2.58 times lower in latency and 2.37 times lower in area than the population count DBI. The statistical DBI circuit 110 may be used for 8/9 encoding or any x/x+1 encoding.

In one embodiment, the adjacent pattern prediction logic 120 includes one or more And-Or-Invert (AOI) gates 124. The adjacent pattern prediction logic 120 may include a first gate level 122a and a second gate level 122b. The first gate level 122a may receive the difference vector. The second gate level 122b may receive the outputs of the first gate level 122a and output the control signal 158. The first gate level 122a may be a first AOI gate level and may include one or more AOI gates 124. The second gate level 122b may include a NAND gate 126.

Each AOI gate 124 may have four inputs (e.g., a 2,2 AOI gate) and may generate an output per the following AOI gate 124 truth table:

| First input | Second input | Third input | Fourth input | Output |
|---|---|---|---|---|
| 1 | 1 | 1 | 1 | 0 |
| 1 | 1 | 1 | 0 | 0 |
| 1 | 1 | 0 | 0 | 0 |
| 1 | 0 | 0 | 0 | 1 |
| 0 | 0 | 0 | 0 | 1 |
| 0 | 0 | 0 | 1 | 1 |
| 0 | 0 | 1 | 1 | 0 |
| 0 | 1 | 1 | 1 | 0 |

The one or more AOI gates 124 may include a first AOI gate 124a and a second AOI gate 124b. Each AOI gate 124 includes two AND portions. If both inputs to any of the AND portions of the AOI gates 124 is a first value (e.g., the corresponding bit 155 of the current data 154 and the corresponding bit 157 of the previous data 156 are not the same for any two XOR gates that correspond with the same AND portion of an AOI gate 124; one or more specific pairs of first and second, third and fourth, fifth and sixth, or seventh and eighth XOR gates are of a first value (e.g., one)), then the corresponding AOI gate 124 will output a value of zero.

In one embodiment, the first AND portion of the first AOI gate 124a receives bits 133b and 133c, the second AND portion of the first AOI gate 124a receives bits 133d and 133e, the first AND portion of the second AOI gate 124b receives 133f and 133g, and the second AND portion of the second AOI gate 124b receives 133h and 133i. The first AOI gate 124a may output a second bit value (e.g., zero) if bits 133b and 133c are both of the first bit value (e.g., one)) (e.g., bits 133b and 133c indicate 155b and 157b toggle and 155c and 157c toggle) and/or bits 133d and 133e are the first bit value (e.g., one) (e.g., bits 133d and 133e indicate 155d and 157d toggle and 155e and 157e toggle)). The second AOI gate 124b may output a second bit value (e.g., zero) if bits 133f and 133g are both of the first bit value (e.g., one)) (e.g., bits 133f and 133g indicate 155f and 157f toggle and 155g and 157g toggle) and/or bits 133h and 133i are the first bit value (e.g., one) (e.g., bits 133h and 133i indicate 155h and 157h toggle and 155i and 157i toggle)).

The NAND gate 126 may receive the output from the first AOI gate 124a and the output from the second AOI gate 124b. Each NAND gate 126 may have two inputs and may follow the following NAND gate 126 truth table:

| First input | Second input | Output |
|---|---|---|
| 0 | 0 | 1 |
| 0 | 1 | 1 |
| 1 | 0 | 1 |
| 1 | 1 | 0 |

The NAND gate 126 may output a control signal 158 in the first state (indicating current data is to be transmitted with toggle in response to the pattern being detected) in response to one or more of the following sets of bits 133 of the difference vector 132 indicating a toggle in the corresponding bit 157 of the previous data 156 and the corresponding bit 155 of the current data 154: 133b and 133c; 133d and 133e; 133f and 133g; and/or 133h and 133i. The NAND gate 126 may output the control signal 158 in the second state (indicating current data is to be transmitted without toggle in response to the pattern not being detected) in response to not receiving at least one bit of the second bit value (e.g., zero) from the AOI gates 124 (e.g., receiving two ones) (e.g., none of the following sets indicate a toggle: 133b and 133c; 133d and 133e; 133f and 133g; and/or 133h and 133i).

The pattern being detected in FIG. 1B is at least two specific bits 133 of the difference vector 132 indicate a toggle in the corresponding bit 157 of the previous data 156 and the corresponding bit 155 of the current data 154. In one embodiment, the at least two specific bits 133 of the difference vector are consecutive. In another embodiment, the at least two specific bits 133 of the difference vector are not consecutive.

The adjacent pattern prediction logic 120 may be coupled to inverting logic 140. The inverting logic 140 receives the control signal 158 and the current data 154. The inverting logic 140 inverts the current data 154 in response to the control signal 158 in a first state and does not invert the current data 154 in response to the control signal 158 in a second state. The inverting logic 140 may include a plurality of logic gates (e.g., XOR gates). For example, if the current data 154 received by the transmitting component 100 has eight bits, the inverting logic 140 may include eight logic gates (e.g., eight XOR gates). Each logic gate may receive a corresponding current bit 155 of the current data 154 and the control signal 158 (e.g., DBI value) and generate an output.

In one embodiment, the control signal 158 in the first state is one, the control signal 158 in the second state is zero, and the plurality of logic gates in the inverting logic 140 are XOR gates. Each XOR gate may receive the corresponding current bit of the current data 154 and the control signal 158 and may generate an output per the XOR truth table shown above.

In another embodiment, the control signal 158 in the first state is zero, the control signal 158 in the second state is one, and the plurality of logic gates in the inverting logic 140 are XNOR gates. Each XNOR gate may receive the corresponding current bit of the current data 154 and the control signal 158 and may generate an output per the following XNOR truth table:

| First input | Second input | Output |
|---|---|---|
| 0 | 0 | 1 |
| 0 | 1 | 0 |
| 1 | 0 | 0 |
| 1 | 1 | 1 |

In response to receiving the control signal 158 in a first state indicating the pattern was detected, the inverting logic 140 will invert the current data 154. In response to receiving the control signal 158 in a second state indicating the pattern was not detected, the inverting logic will not invert the current data 154. The data output by the inverting logic 140 may include new previous data 156 derived from the current data 154) and the control signal 158. The new previous data 156 and control signal 158 may be transmitted to the comparison logic 130 (e.g., to determine if new current data 154 is to be inverted). The inverting logic 140 is coupled to the transmitter 150 of transmitting component 100. Inverting logic 140 transmits the new previous data 156 and control signal 158 to the transmitter 150 to be transmitted via the data bus 152. In one embodiment, the transmitter 150 transmits the new previous data 156 and the control signal via a physical transmission media. In another embodiment, the transmitter 150 is to transmit the new previous data 156 and the control signal via wireless communication. In certain embodiments, the transmitting component 100 is a pre-driver and is coupled to a driver.

In another embodiment, more than two bits 157 of previous data 156 being different from corresponding bits 155 of the current data 154 causes a control signal 158 in a first state to be output by the adjacent pattern prediction logic 120 (e.g., FIG. 1C-D).

FIG. 1C illustrates a transmitting component 100 including a statistical DBI circuit 110 that includes adjacent pattern prediction logic 120, according to certain embodiments.

In certain embodiments, the current data 154 may include 8 bits (e.g., bits 155a-h) and the previous data 156 may include 8 bits (bits 157a-h), where each of the bits 155 of current data 154 may correspond to a corresponding bit 157 of the previous data 156. The control signal 158 may be added as an additional bit to the previous data 156, increasing the number of bits of the previous data 156 to 9 bits 157 and an additional bit (e.g., with a value of zero) may be added to the current data 154 to correspond to the control signal 158, increasing the number of bits of the current data 154 to 9 bits 155. In one embodiment, the comparison logic 130 may receive the nine bits 155 of the current data 154 and the nine bits 157 of the previous data 156.

The comparison logic 130 generates a difference vector 132 by comparing a bit 157 of previous data with a corresponding bit 155 of current data 154 to generate a bit 133 of the difference vector. In one embodiment, the comparison logic 130 includes a plurality of XOR gates. The plurality of XOR gates may include a nine XOR gates. A corresponding bit 155 of the current data 154 and a corresponding bit 157 of the previous data 156 may be received by each of the corresponding XOR gates and each XOR gate may generate an output of bit 133 per the XOR gate truth table shown above.

If the corresponding bit 155 of the current data 154 and the corresponding bit 157 of the previous data 156 do not have the same value (e.g., toggle, do not match), then a first type of bit value (e.g., one) may be output as bit 133 by the XOR gate for inclusion in the difference vector 132. If the corresponding bit 155 of the current data 154 and the corresponding bit 157 of the previous data 156 have the same value (e.g., match, do not toggle), then a second type of bit value (e.g., zero) may be output as bit 133 by the XOR gate for inclusion in the difference vector 132.

The comparison logic 130 generates a difference vector 132 of bits 133a-i from the nine outputs, each of which correspond to one of the nine XOR gates. In another embodiment, comparison logic 130 uses a different type of logic gate (e.g., nine XNOR gates).

The comparison logic 130 may be coupled to the adjacent pattern prediction logic 120. In FIG. 1C, the adjacent pattern prediction logic 120 may include two levels 122 of AOI gates 124 and may only invert the bits 155 of the current data 154 when both levels 122 (e.g., levels of predictors, AOI gate levels) agree. The AOI gate 124e in the second gate level 122b may be the same as the AOI gates 124 in FIG. 1B but has been offset by one bit. The adjacent pattern prediction logic 120 in FIG. 1C may determine whether three consecutive bits 133 in the difference vector 132 are ones (e.g., indicate the corresponding bit 157 of previous data 156 and the corresponding bit 155 of current data 154 are not the same). The adjacent pattern prediction logic 120 may look for a pattern in a hamming distance vector.

In certain embodiments, the adjacent pattern prediction logic 120 of FIG. 1C may include a combination of the AOI gates 124 of FIG. 1B. The first predictor (e.g., first gate level 122a) may group 133a and 133b, 133c and 133d, 133e and 133f, and 133f and 133g and the second parallel predictor (e.g., second gate level 122b) may group 133b and 133c, 133d and 133e, 133f and 133g, and 133h and 133i. If both the first predictor and the second predictor agree, the adjacent pattern prediction logic 120 predicts that transmission of the current data 154 with toggle is more efficient than transmission of the current data 154 without toggle (e.g., predict that the number of bits 133 in the difference vector 132 that indicate the corresponding bits 155 and 157 are not the same are greater than five).

In one example, the statistical DBI circuit 110 in FIG. 1C may save about 13.4% of energy (e.g., toggles) with 107 ps of latency and 13.78 μm² area which is 2.3 times lower in latency and 1.68 times lower in area than a population count DBI.

The adjacent pattern prediction logic 120 receives the difference vector 132 and outputs a control signal 158. The adjacent pattern prediction logic 120 may include a first gate level 122a and a second gate level 122b. The first gate level 122a may receive the difference vector. The second gate level 122b may receive the outputs of the first gate level 122a and output the control signal 158. The first gate level 122a may be a first AOI gate level and may include one or more AOI gates 124. The second gate level 122b may be a second AOI gate level and may include AOI gate 124e.

Each AOI gate 124 in the first gate level 122a may have four inputs (e.g., the corresponding AND portion of each of the AOI gates 124 may receive two bits 133 from the difference vector 132 (e.g., receive output from two XOR gates)) and may generate an output per the AOI gate 124 truth table shown above.

The first gate level 122a may include a first AOI gate 124a, a second AOI gate 124b, a third AOI gate 124c, and a fourth AOI gate 124d. In one embodiment, the first AND portion of first AOI gate 124a receives bits 133a and 133b, the second AND portion of first AOI gate 124a receives bits 133c and 133d, the first AND portion of second AOI gate 124b receives bits 133b and 133c, the second AND portion of second AOI gate 124b receives bits 133d and 133e, the first AND portion of third AOI gate 124c receives bits 133e and 133f, the second AND portion of third AOI gate 124c receives bits 133g and 133h, the first AND portion of fourth AOI gate 124d receives bits 133f and 133g, and the second AND portion of fourth AOI gate 124d receives bits 133h and 133i.

Any one of the AOI gates 124a-d may output a second bit value (e.g., zero) in response to the two inputs to an AND portion of the AOI gate 124 being equal (e.g., matching).

The AOI gate 124e in the second gate level 122b may have four inputs (e.g., both of the AND portions of the AOI gate 124e may receive output from two AOI gates 124 of the first gate level 122a) and may generate an output per the AOI gate 124 truth table shown above. The first AND portion of the AOI gate 124e may receive output of the first AOI gate 124a and output of the second AOI gate 124b. The second AND portion of the AOI gate 124 may receive output of the third AOI gate 124c and output of the fourth AOI gate 124d.

The adjacent pattern prediction logic 120 outputs a control signal 158 in a first state indicating the pattern was detected and the current data 154 is to be inverted in response to the first gate level 122a and the second gate level 122b agreeing. A control signal 158 in the first state is output in response to one or more of the following sets of bits 133 of the difference vector 132 indicating a toggle in the corresponding bit 157 of the previous data 156 and the corresponding bit 155 of the current data 154: 133a, 133b, and 133c; 133a, 133b, 133d, and 133e; 133b, 133c, and 133d; 133c, 133d, and 133e; 133e, 133f, and 133g; 133e, 133f, 133h, and 133i; 133f, 133g, and 133h; and/or 133g, 133h, and 133i.

The pattern being detected in FIG. 1C is at least three specific bits 133 of the difference vector 132 indicate a toggle in the corresponding bit 157 of the previous data 156 and the corresponding bit 155 of the current data 154. In one embodiment, the at least three specific bits 133 of the difference vector are consecutive. In another embodiment, the at least three specific bits 133 of the difference vector are not consecutive.

The adjacent pattern prediction logic 120 may be coupled to inverting logic 140 which is coupled to transmitter 150, as described in FIG. 1B.

FIG. 1D illustrates a transmitting component 100 including a statistical DBI circuit 110 that includes adjacent pattern prediction logic 120, according to certain embodiments. The comparison logic 130, difference vector 132, inverting logic 140, transmitter 150, and data bus 152 of FIG. 1D may be similar to those described with relation to FIG. 1C.

The adjacent pattern prediction logic 120 in FIG. 1D includes a three gate levels 122. The first gate level 122a may include a plurality of AND gates 128. In one embodiment, the difference vector 132 has 9 bits and the first gate level 122a has eight AND gates 128. Each AND gate 128 may receive input from two specific bits 133 of the difference vector 132 and generate an output per the following AND gate 128 truth table:

| First input | Second input | Output |
|---|---|---|
| 0 | 0 | 0 |
| 0 | 1 | 0 |
| 1 | 0 | 0 |
| 1 | 1 | 1 |

The AND gate 128 may output a bit of a first value (e.g., one) if the two corresponding bits 133 of the difference vector 132 indicate that the corresponding bits 157 of the previous data 156 and bits 155 of the current data 154 toggle (e.g., are not the same).

The output of the first gate level 122a is transmitted to the second gate level 122b. The second gate level may include one or more OR gates 129 (e.g., OR gates 129a-b). Each OR gate 129 may receive input from four AND gates 128 to generate an output and may follow the following OR gate 129 truth table:

| First input | Second input | Third input | Fourth input | Output |
|---|---|---|---|---|
| 0 | 0 | 0 | 0 | 0 |
| 0 | 0 | 0 | 1 | 1 |
| 0 | 0 | 1 | 1 | 1 |
| 0 | 1 | 1 | 1 | 1 |
| 1 | 1 | 1 | 1 | 1 |

The output of the second gate level 122b is transmitted to the third gate level 122c. The third gate level 122c may include an AND gate 128i that follows the AND gate 128 truth table shown above.

The adjacent pattern prediction logic 120 in FIG. 1D determines if the difference vector 132 includes at least two pairs of bits 133 of a first value (e.g., one), where the first pair of bits 133 corresponds to an AND gate 128 in the first gate level 122a that corresponds to the first OR gate 129a and the second pair of bits 133 corresponds to an AND gate 128 in the first gate level 122a that corresponds to the second OR gate 129b. The pattern of FIG. 1D is that at least four specific bits 133 of the difference vector 132 indicate the corresponding bit 157 of previous data 156 and the corresponding bit 155 of current data 154 toggle.

FIG. 1E illustrates a transmitting component 100 including a statistical DBI circuit 110 that includes adjacent pattern prediction logic 120, according to certain embodiments. The comparison logic 130, difference vector 132, inverting logic 140, transmitter 150, and data bus 152 of FIG. 1E may be similar to those described with relation to FIG. 1B.

The adjacent pattern prediction logic 120 in FIG. 1E includes a two gate levels 122. The first gate level 122a may include a plurality of AND gates 128. In one embodiment, the difference vector 132 has 8 bits 133 and the first gate level 122a has four AND gates 128. Each AND gate 128 may receive input from two specific bits 133 of the difference vector 132 and generate an output per the AND gate 128 truth table described above.

The AND gate 128 may output a bit of a first value (e.g., one) if the two corresponding bits 133 of the difference vector indicate that the corresponding bits 157 of the previous data 156 and bits 155 of the current data 154 toggle (e.g., are not the same).

The output of the first gate level 122a is transmitted to the second gate level 122b. The second gate level may include OR gate 129 that receives input from the four AND gates 128a-d to generate an output and may follow the OR gate 129 truth table described above.

The adjacent pattern prediction logic 120 in FIG. 1E determines if the difference vector 132 includes at least two bits 133 of a first value (e.g., one), where the at least two bits 133 correspond to the same AND gate 128. The pattern of FIG. 1D is that at least two specific bits 133 of the difference vector 132 indicate the corresponding bit 157 of previous data 156 and the corresponding bit 155 of current data 154 are not the same (e.g., toggle).

Figure 2:
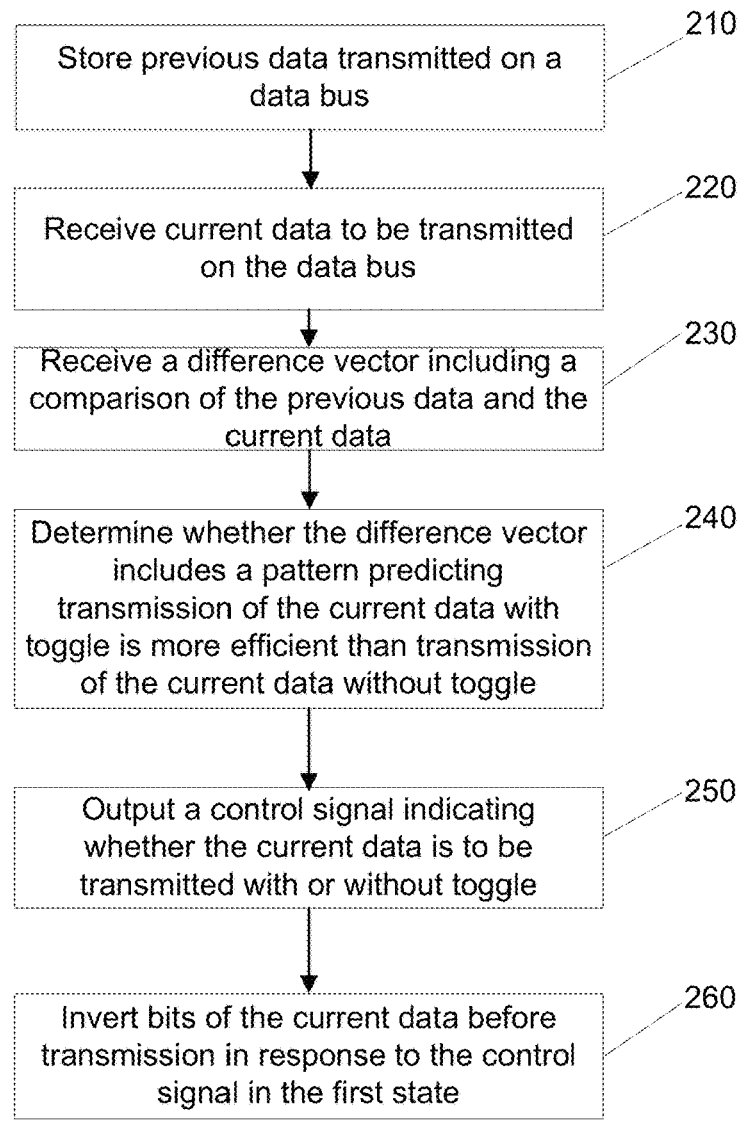
FIG. 2 is a flow diagram of a method of low latency statistical DBI, according to one embodiment.

FIG. 2 is a flow diagram of a method 200 of low latency statistical DBI, according to one embodiment. Method 200 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 200 may be performed, in part, by a transmitting component 100 or statistical DBI circuit 110 described above with respect to FIGS. 1A-1E.

For simplicity of explanation, the method 200 is depicted and described as a series of acts. However, acts in accordance with this disclosure can occur in various orders and/or concurrently and with other acts not presented and described herein. Furthermore, not all illustrated acts may be performed to implement the method 200 in accordance with the disclosed subject matter. In addition, those skilled in the art will understand and appreciate that the method 200 could alternatively be represented as a series of interrelated states via a state diagram or events.

Referring to FIG. 2, at 210 the processing logic stores (e.g., by a statistical DBI circuit 110 of a transmitting component 100) previous data 156 transmitted on a data bus 152. The previous data 156 includes bits 157 (e.g., bits 157a-h). The processing logic also stores a control signal 158 (e.g., DBI value) that corresponds to the previous data 156.

At block 220, the processing logic receives (e.g., by the statistical DBI circuit 110) current data 154 to be transmitted on the data bus 152. The current data 154 includes bits 155 (e.g., bits 155 a-h).

At block 230, the processing logic receives, by adjacent pattern prediction logic 120 of the statistical DBI circuit 110, a difference vector 132 which includes a comparison of the previous data 156 and the current data 154. The difference vector 132 includes a plurality of bits 133 (e.g., bits 133a-i, bits 133b-i), each bit 133 indicating whether a corresponding previous bit 157 of the previous data 156 and a corresponding current bit 155 of the current data 154 are equal (e.g., are both a first bit value (e.g., one), are both a second bit value (e.g., zero), do not toggle). The difference vector 132 may be generated by comparison logic 130. The comparison logic may include XOR gates or XNOR gates to compare corresponding bits 157 of the previous data 156 with corresponding bits 155 of the current data 154. Each of the XOR gates or XNOR gates may receive the corresponding previous bit 157 and the corresponding current bit 155 and generate the difference vector 132 by outputting a first type of bit value in response to the corresponding previous bit 157 not matching the corresponding current bit 155 and outputting a second type of bit value in response to the corresponding previous bit 157 matching the corresponding current bit 155.

The processing logic may receive the difference vector 132 via a first gate level 122a of the adjacent pattern prediction logic 120. In one embodiment, the first gate level 122a includes one or more AOI gates 124. In another embodiment, the first gate level 122a includes one or more AND gates 128. In another embodiment, the first gate level 122a includes other logic gates.

At block 240, the processing logic determines, by the adjacent pattern prediction logic 120, whether the difference vector 132 includes a pattern predicting transmission of the current data 154 with toggle (e.g., current data 154 that is inverted) is more efficient than transmission of the current data 154 without toggle (e.g., without being inverted).

The determining whether the difference vector 132 includes a pattern may be via two or more gate levels 122 of the adjacent pattern prediction logic 120. In one embodiment, the first gate level 122a includes AOI gates 124 (e.g., AOI gates 124a-b) and the second gate level includes a NAND gate 126 (see FIG. 1B). In another embodiment, the first gate level includes AOI gates 124 (e.g., AOI gates 124a-d) and the second gate level 122b includes AOI gate 124e (see FIG. 1C). In another embodiment, the first gate level includes AND gates 128 (e.g., AND gates 128a-h), the second gate level 122b includes OR gates (e.g., OR gates 129a-b), and third gate level 122c includes AND gate 128i (see FIG. 1D). In another embodiment, the first gate level includes AND gates 128 (e.g., AND gates 128a-d) and the second gate level 122b includes OR gate 129 (see FIG. 1E).

The pattern may include at least two bits 133 (e.g., two specific bits 133, two consecutive bits 133) of the difference vector 132 indicating the corresponding bit 157 of the previous data 156 does not match the corresponding bit 155 of the current data 154 (see FIGS. 1B and 1E). The pattern may include at least three bits 133 (e.g., three specific bits 133, three consecutive bits 133) of the difference vector 132 indicating the corresponding bit 157 of the previous data 156 does not match the corresponding bit 155 of the current data 154 (see FIG. 1C). The pattern may include at least four bits 133 (e.g., four specific bits 133, a first set of consecutive bits 133 and a second set of consecutive bits) of the difference vector 132 indicating the corresponding bit 157 of the previous data 156 does not match the corresponding bit 155 of the current data 154 (see FIG. 1D).

At block 250, the processing logic outputs, by the adjacent pattern prediction logic 120, a control signal 158 indicating whether the current data 154 is to be transmitted with or without toggle. The control signal 158 in a first state indicates the current data 154 is to be transmitted with toggle in response to the pattern being detected by the adjacent pattern prediction logic 120. The control signal 158 in a second state indicates the current data 154 is to be transmitted without toggle in response to the pattern not being detected by the adjacent pattern prediction logic 120.

At block 260, the processing logic inverts, by inverting logic 140 of the statistical DBI circuit 110, bits 155 of the current data 154 before transmission in response to the control signal 158 being in the first state.

In another implementation, the method 200 includes generating, by comparison logic 130 of a statistical DBI circuit 110 of a transmitting component 100, a comparison of previous data 156 transmitted on a data bus 152 and current data 154 to be transmitted on the data bus 152. The method 200 further includes determining, by adjacent pattern prediction logic 120 of the statistical DBI circuit 110, whether the comparison comprises a pattern predicting transmission of the current data 154 with toggle is more efficient than transmission of the current data 154 without toggle. The method 200 further includes outputting, by the adjacent pattern prediction logic 120, a control signal 158 indicating whether the current data 154 is to be transmitted with or without toggle. The control signal 158 in a first state indicates the current data 154 is to be transmitted with toggle in response to the pattern being detected by the adjacent pattern prediction logic 120 and the control signal 158 in a second state indicates the current data 154 is to be transmitted without toggle in response to the pattern not being detected by the adjacent pattern prediction logic 120. The method 200 includes inverting, by inverting logic 140 of the statistical DBI circuit 110, bits of the current data before transmission in response to the control signal 158 in the first state.

Figure 3:
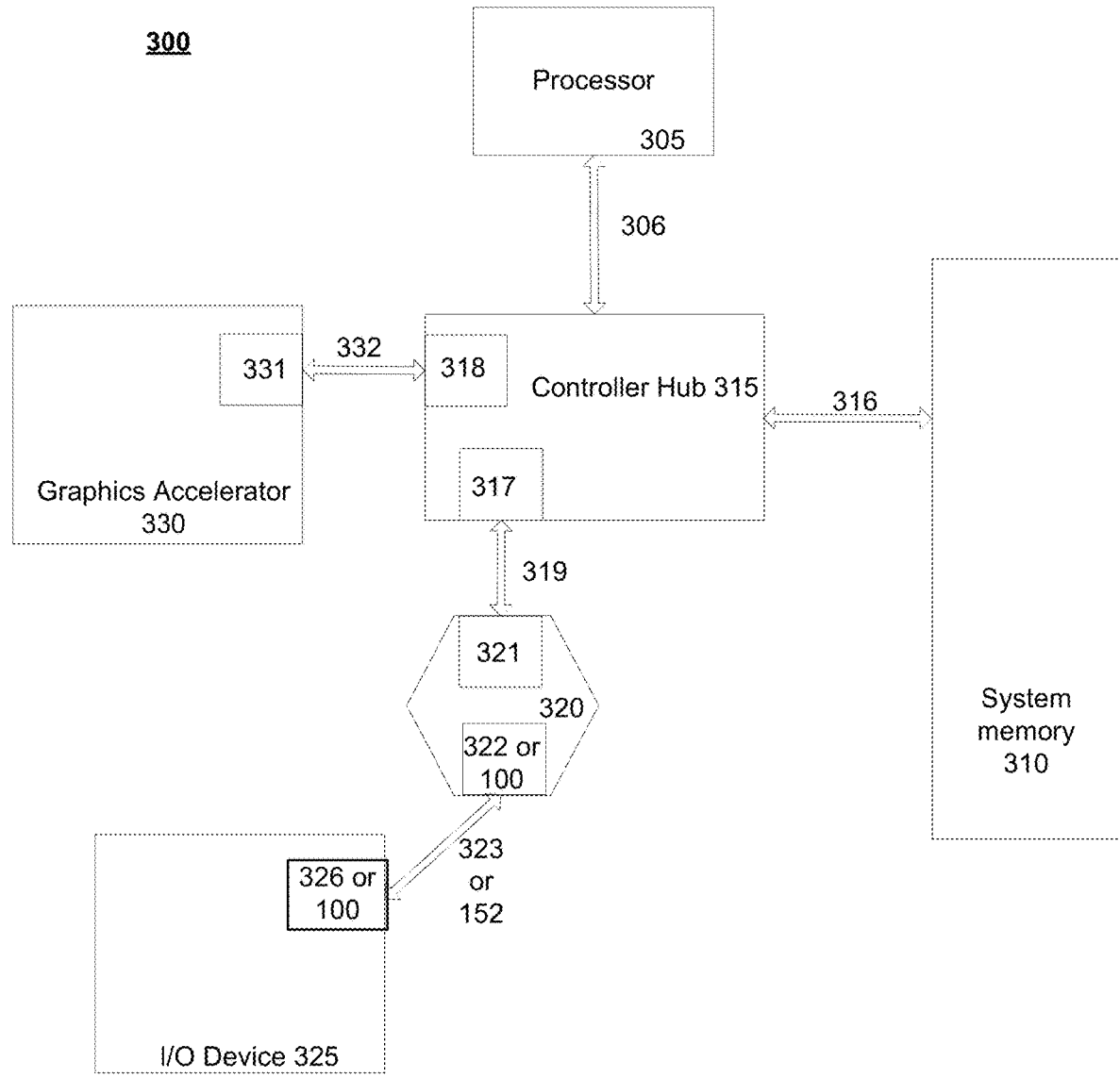
FIG. 3 illustrates a computing system with multiple interconnects with adjacent pattern prediction logic, according to certain embodiments.

FIG. 3 illustrates a computer system 300 with multiple interconnects with adjacent pattern prediction logic 120, according to one embodiment. System 300 includes processor 305 and system memory 310 coupled to controller hub 315. Processor 305 includes any processing element, such as a microprocessor, a host processor, an embedded processor, a co-processor, or other processor. Processor 305 is coupled to controller hub 315 through front-side bus (FSB) 306. In one embodiment, FSB 306 is a serial point-to-point interconnect as described below. In another embodiment, FSB 306 (e.g., link) includes a serial, differential interconnect architecture that is compliant with different interconnect standards.

System memory 310 includes any memory device, such as random access memory (RAM), non-volatile (NV) memory, or other memory accessible by devices in system 300. System memory 310 is coupled to controller hub 315 through memory interface 316. Examples of a memory interface include a double-data rate (DDR) memory interface, a dual-channel DDR memory interface, and a dynamic RAM (DRAM) memory interface.

In one embodiment, controller hub 315 is a root hub, root complex, or root controller. Examples of controller hub 315 include a chipset, a memory controller hub (MCH), a north bridge, an interconnect controller hub (ICH) a south bridge, and a root controller/hub. Often the term chipset refers to two physically separate controller hubs, i.e. a memory controller hub (MCH) coupled to an interconnect controller hub (ICH). Note that current systems often include the MCH integrated with processor 305, while controller 315 is to communicate with I/O devices, in a similar manner as described below. In some embodiments, peer-to-peer routing is optionally supported through root complex (e.g., controller 315).

Here, controller hub 315 is coupled to switch/bridge 320 through serial link 319. Input/output modules 317 and 321, which may also be referred to as interfaces/ports 317 and 321, include/implement a layered protocol stack to provide communication between controller hub 315 and switch 320. In one embodiment, multiple devices are capable of being coupled to switch 320.

Switch/bridge 320 routes packets/messages from device 325 upstream, i.e. up a hierarchy towards a root complex, to controller hub 315 and downstream, i.e. down a hierarchy away from a root controller, from processor 305 or system memory 310 to device 325. Switch 320, in one embodiment, is referred to as a logical assembly of multiple virtual PCI-to-PCI bridge devices. Device 325 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Fire wire device, a Universal Serial Bus (USB) device, a scanner, and other input/output devices. Often in the PCIe® vernacular, such as device, is referred to as an endpoint. Although not specifically shown, device 325 may include a PCIe® to PCI/PCI-X bridge to support legacy or other version PCI devices. Endpoint devices in PCIe® are often classified as legacy, PCIe®, or root complex integrated endpoints.

Graphics accelerator 330 is also coupled to controller hub 315 through serial link 332. In one embodiment, graphics accelerator 330 is coupled to an MCH, which is coupled to an ICH. Switch 320, and accordingly I/O device 325, is then coupled to the ICH. I/O modules 331 and 318 are also to implement a layered protocol stack to communicate between graphics accelerator 330 and controller hub 315. Similar to the MCH discussion above, a graphics controller or the graphics accelerator 330 itself may be integrated in processor 305.

I/O device 325 includes an interface 326 and switch/bridge 320 includes an interface 322. Interface 326 is coupled to interface 322 via serial link 323. Switch/bridge 320, interface 322, controller hub 315, interface 317, interface 321, on switch 320, and/or I/O device 325 may include transmitting component 100 that includes adjacent pattern prediction logic 120 that indicates that current data 154 is to be inverted prior to being transmitted in response to detecting a pattern in the current data 154.

In one embodiment, short range wireless engines including a WLAN unit and a Bluetooth® unit may couple to processor 305 via an interconnect according to a PCIe® protocol, e.g., in accordance with the PCI Express® Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard. Using WLAN unit, Wi-Fi® communications in accordance with a given Institute of Electrical and Electronics Engineers (IEEE) 802.11 standard can be realized, while via a unit using the Bluetooth® technology, short range communications via a Bluetooth® protocol can occur. In another embodiment, these units may communicate with processor 305 via, e.g., a USB link or a universal asynchronous receiver transmitter (UART) link.

Figure 4:
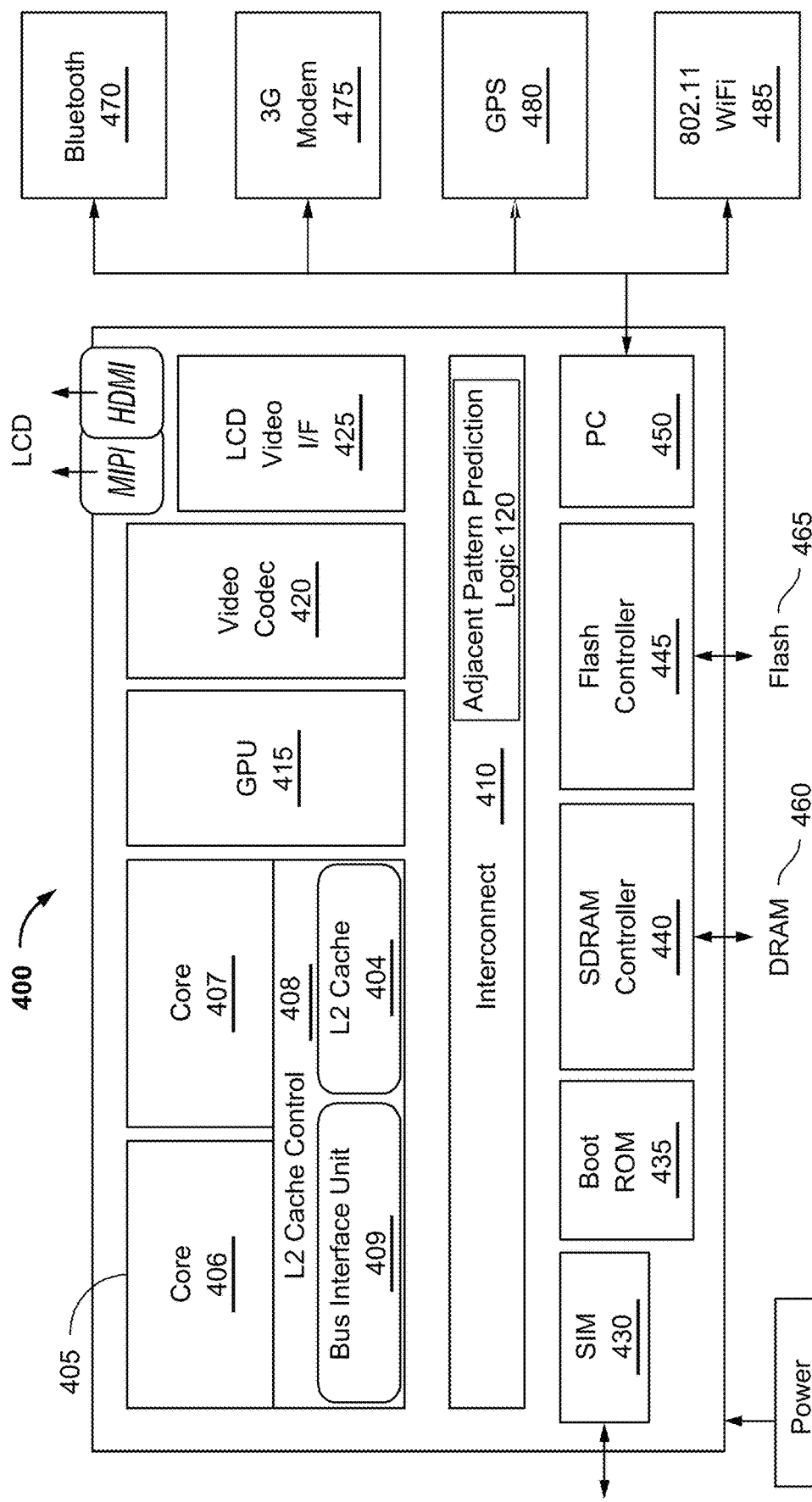
FIG. 4 illustrates a system on a chip (SOC) design, according to one embodiment.

Turning next to FIG. 4, an embodiment of a system on-chip (SOC) design in accordance with the disclosures is depicted. As a specific illustrative example, SOC 400 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 400 includes 2 cores—406 and 407. Similar to the discussion above, cores 406 and 407 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 406 and 407 are coupled to cache control 408 that is associated with bus interface unit 409 and L2 cache 404 to communicate with other parts of system 400. Interconnect 410 includes an on-chip interconnect, such as an IOSF, AMBA, or other interconnect discussed above, which potentially implements one or more aspects of the described disclosure. In one embodiment, interconnect 410 includes adjacent pattern prediction logic 120.

Interface 410 provides communication channels to the other components, such as a Subscriber Identity Module (SIM) 430 to interface with a SIM card, a boot rom 435 to hold boot code for execution by cores 406 and 407 to initialize and boot SOC 400, a SDRAM controller 440 to interface with external memory (e.g. DRAM 460), a flash controller 445 to interface with non-volatile memory (e.g. Flash 465), a peripheral control 450 (e.g. Serial Peripheral Interface) to interface with peripherals, video codecs 420 and Video interface 425 to display and receive input (e.g. touch enabled input), GPU 415 to perform graphics related computations, etc. Any of these interfaces may incorporate aspects of the disclosure described herein.

Interconnect 410 may connect with another component via a data bus 152 (e.g., on-chip interconnect, IOSF, AMBA, or other interconnect). The adjacent pattern prediction logic 120 may indicate that current data 154 is to be inverted prior to being transmitted in response to finding a pattern in the current data 154.

In addition, the system illustrates peripherals for communication, such as a Bluetooth® module 470, 3G modem 475, GPS 485, and Wi-Fi® 485. Note as stated above, a UE includes a radio for communication. As a result, these peripheral communication modules are not all required. However, in a UE some form a radio for external communication is to be included.

Figure 5:
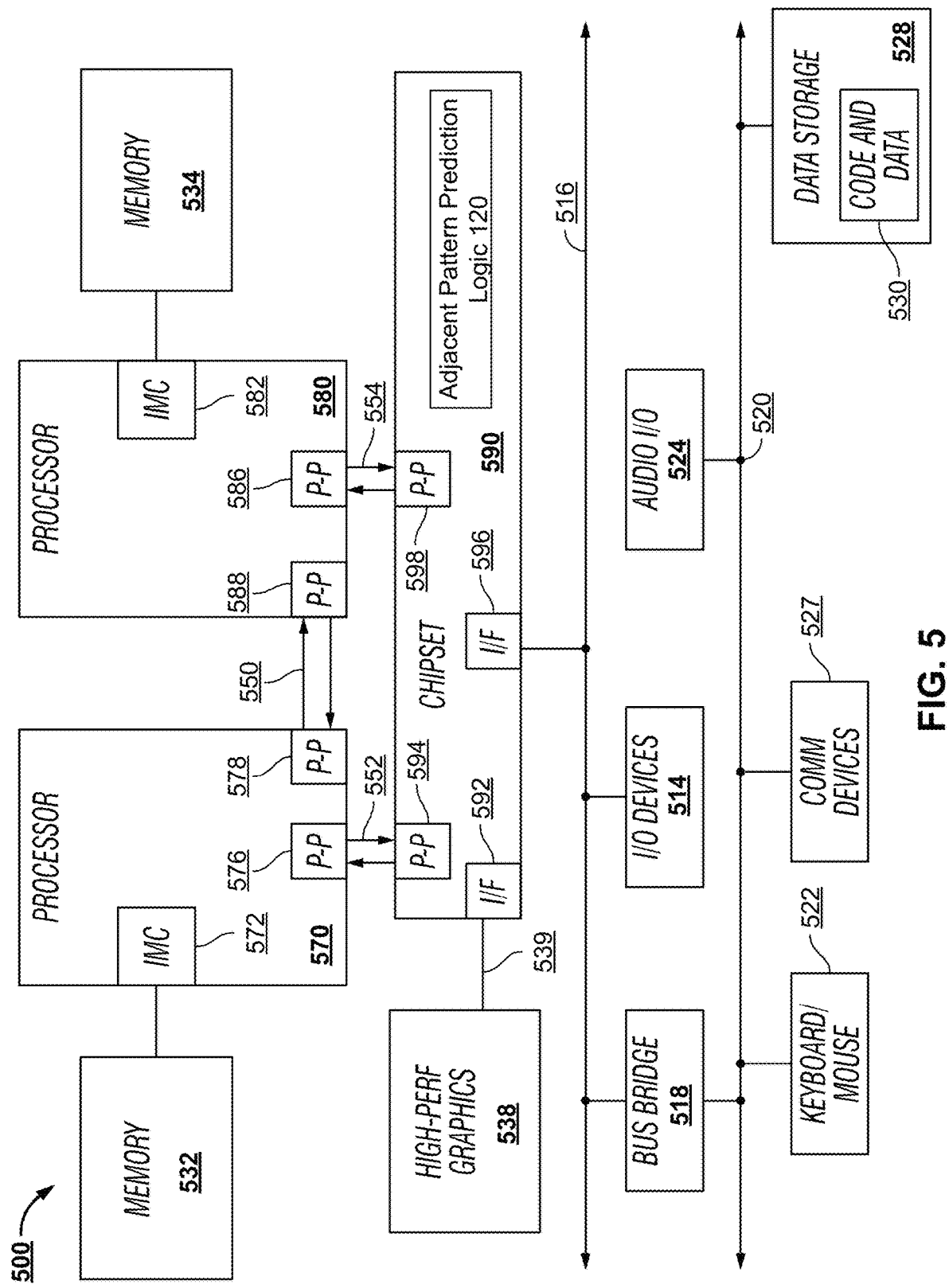
FIG. 5 illustrates a block diagram for a computing system, according to certain embodiments.

Referring now to FIG. 5, shown is a block diagram of a system 500 in accordance with an embodiment of the disclosure. As shown in FIG. 5, multiprocessor system 500 is a point-to-point interconnect system, and includes a first processor 570 and a second processor 580 coupled via a point-to-point interconnect 550. Each of processors 570 and 580 may be some version of a processor. In one embodiment, 552 and 554 are part of a serial, point-to-point coherent interconnect fabric, such as Intel® Quick Path Interconnect (QPI) architecture. As a result, the disclosure may be implemented within the QPI architecture.

While shown with only two processors 570, 580, it is to be understood that the scope of the present disclosure is not so limited. In other embodiments, one or more additional processors may be present in a given processor.

Processors 570 and 580 are shown including integrated memory controller units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 each exchange information with a chipset 590 via individual P-P interfaces 552, 554 using point to point interface circuits 576, 594, 586, 598. Chipset 590 also exchanges information with a high-performance graphics circuit 538 via an interface circuit 592 along a high-performance graphics interconnect 539. In one embodiment, chipset 590 includes adjacent pattern prediction logic 120.

Chipset 590 may connect with another component via a data bus 152 (e.g., P-P interface 552, P-P interface 554, high-performance graphics interconnect 539, bus 516, and so forth). The adjacent pattern prediction logic 120 may indicate that current data 154 is to be inverted prior to being transmitted in response to finding a pattern in the current data 154.

A shared cache (not shown) may be included in either processor or outside of both processors; yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present disclosure is not so limited.

As shown in FIG. 5, various I/O devices 514 are coupled to first bus 516, along with a bus bridge 518 which couples first bus 516 to a second bus 520. In one embodiment, second bus 520 includes a low pin count (LPC) bus. Various devices are coupled to second bus 520 including, for example, a keyboard and/or mouse 522, communication devices 527 and a storage unit 528 such as a disk drive or other mass storage device which often includes instructions/code and data 530, in one embodiment. Further, an audio I/O 524 is shown coupled to second bus 520. Note that other architectures are possible, where the included components and interconnect architectures vary. For example, instead of the point-to-point architecture of FIG. 5, a system may implement a multi-drop bus or other such architecture.

The following examples pertain to further embodiments.

Example 1 is a transmitting component comprising: a transmitter; and a statistical data bus inversion (DBI) circuit coupled to the transmitter, wherein the statistical DBI circuit is to receive current data to be transmitted on a data bus and is to store previous data transmitted on the data bus, the statistical DBI circuit comprising: inverting logic to invert bits of the current data before transmission in response to a control signal in a first state; and adjacent pattern prediction logic coupled to the inverting logic, the adjacent pattern prediction logic to: receive a difference vector comprising a comparison of the previous data and the current data;

determine whether the difference vector comprises a pattern predicting transmission of the current data with toggle is more efficient than transmission of the current data without toggle; and output the control signal indicating whether the current data is to be transmitted with or without toggle, wherein the control signal in the first state indicates current data is to be transmitted with toggle in response to the pattern being detected by the adjacent pattern prediction logic and the control signal in a second state indicates the current data is to be transmitted without toggle in response to the pattern not being detected by the adjacent pattern prediction logic.

In Example 2, the subject matter of Example 1, wherein the difference vector comprises a plurality of bits, each bit indicating whether a corresponding previous bit of the previous data and a corresponding current bit of the current data are equal; and the pattern comprises at least two bits of the difference vector indicating the corresponding previous bit and the corresponding current bit are not equal.

In Example 3, the subject matter of any one of Examples 1-2, wherein the pattern comprises at least three bits of the difference vector indicating the corresponding previous bit and the corresponding current bit are not equal.

In Example 4, the subject matter of any one of Examples 1-3, wherein: the difference vector comprises a plurality of bits, each bit indicating whether a corresponding previous bit of the previous data and a corresponding current bit of the current data are equal; the statistical DBI circuit comprises a plurality of Exclusive OR (XOR) gates comprising a first XOR gate, a second XOR gate, a third XOR gate, and a fourth XOR gate; each of the plurality of XOR gates is to receive the corresponding previous bit and the corresponding current bit and is to generate the difference vector by outputting a first type of bit value in response to the corresponding previous bit not matching the corresponding current bit and outputting a second type of bit value in response to the corresponding previous bit matching the corresponding current bit; the adjacent pattern prediction logic receiving the difference vector is via a first And-Or-Invert (AOI) gate of the adjacent pattern prediction logic receiving first output of the first XOR gate, second output of the second XOR gate, third output of the third XOR gate, and fourth output of the fourth XOR gate; the adjacent pattern prediction logic outputting the control signal in the first state is in response to at least one of the first output matching the second output or the third output matching the fourth output; and the adjacent pattern prediction logic outputting the control signal in the second state is in response to the first output not matching the second output and the third output not matching the fourth output.

In Example 5, the subject matter of any one of Examples 1-4, wherein: the plurality of XOR gates further comprises a fifth XOR gate, a sixth XOR gate, a seventh XOR gate, and an eighth XOR gate; the adjacent pattern prediction logic receiving the difference vector is further via a second AOI gate of the adjacent pattern prediction logic receiving fifth output of the fifth XOR gate, sixth output of the sixth XOR gate, seventh output of the seventh XOR gate, and eight output of the eight XOR gate; and a NOT AND (NAND) gate of the adjacent pattern prediction logic is to receive output from the first AOI gate and the second AOI gate and is to generate the control signal.

In Example 6, the subject matter of any one of Examples 1-5, wherein: the difference vector comprises a plurality of bits, each bit indicating whether a corresponding previous bit of the previous data and a corresponding current bit of the current data are equal; the statistical DBI circuit comprises a plurality of Exclusive OR (XOR) gates comprising a first XOR gate, a second XOR gate, a third XOR gate, a fourth XOR gate, and a fifth XOR gate; each of the plurality of XOR gates is to receive the corresponding previous bit and the corresponding current bit and is to generate the difference vector by outputting a first type of bit value in response to the corresponding previous bit not matching the corresponding current bit and outputting a second type of bit value in response to the corresponding previous bit matching the corresponding current bit; the adjacent pattern prediction logic receiving the difference vector is via a first And-Or-Invert (AOI) gate and a second AOI gate of the adjacent pattern prediction logic; the first AOI gate receives first output of the first XOR gate, second output of the second XOR gate, third output of the third XOR gate, and fourth output of the fourth XOR gate; the second AOI gate receives second output of the second XOR gate, third output of the third XOR gate, fourth output of the fourth XOR gate, and fifth output of the fifth XOR gate; a third AOI gate of the adjacent pattern prediction logic is to receive output from the first AOI gate and the second AOI gate and is to generate the control signal; the adjacent pattern prediction logic outputting the control signal in the first state is in response to at least one of: the first output, second output, and third output matching; the second output, the third output, and fourth output matching; or the third output, the fourth output, and the fifth output matching; and the adjacent pattern prediction logic outputting the control signal in the second state in response to: the first output, second output, and third output not matching; the second output, the third output, and fourth output not matching; and the third output, the fourth output, and the fifth output not matching.

In Example 7, the subject matter of any one of Examples 1-6, wherein the adjacent pattern prediction logic comprises two or more gate levels to determine whether the difference vector comprises the pattern predicting the transmission of the current data with toggle is more efficient than the transmission of the current data without toggle.

Example 8 is a method comprising: generating, by comparison logic of a statistical data bus inversion (DBI) circuit of a transmitting component, a comparison of previous data transmitted on a data bus and current data to be transmitted on the data bus; determining, by adjacent pattern prediction logic of the statistical DBI circuit, whether the comparison comprises a pattern predicting transmission of the current data with toggle is more efficient than transmission of the current data without toggle; outputting, by the adjacent pattern prediction logic, a control signal indicating whether the current data is to be transmitted with or without toggle, wherein the control signal in a first state indicates the current data is to be transmitted with toggle in response to the pattern being detected by the adjacent pattern prediction logic, and the control signal in a second state indicates the current data is to be transmitted without toggle in response to the pattern not being detected by the adjacent pattern prediction logic; and inverting, by inverting logic of the statistical DBI circuit, bits of the current data before transmission in response to the control signal in the first state.

In Example 9, the subject matter of Example 8, wherein: the generating of the comparison comprises comparing a corresponding previous bit of the previous data and a corresponding current bit of the current data; and the pattern comprises the comparison indicating at least two instances of the corresponding previous bit and the corresponding current bit are not equal.

In Example 10, the subject matter of any one of Examples 8-9, wherein the pattern comprises the comparison indicating at least three instances of the corresponding previous bit and the corresponding current bit are not equal.

In Example 11, the subject matter of any one of Examples 8-10, wherein: the generating of the comparison comprises: receiving, by each of a plurality of Exclusive OR (XOR) gates of the comparison logic, a corresponding previous bit of the previous data and a corresponding current bit of the current data, the plurality of XOR gates comprising a first XOR gate, a second XOR gate, a third XOR gate, and a fourth XOR gate; comparing, by each of the plurality of XOR gates, the corresponding previous bit and the corresponding current bit; outputting, by each of the plurality of XOR gates, a first type of bit value in response to the corresponding previous bit not matching the corresponding current bit; and outputting, by each of the plurality of XOR gates, a second type of bit value in response to the corresponding previous bit matching the corresponding current bit; the determining whether the comparison comprises the pattern comprises receiving, by a first And-Or-Invert (AOI) gate of the adjacent pattern prediction logic, first output of the first XOR gate, second output of the second XOR gate, third output of the third XOR gate, and fourth output of the fourth XOR gate; the outputting of the control signal in the first state is in response to at least one of the first output matching the second output or the third output matching the fourth output; and the outputting of the control signal in the second state is in response to the first output not matching the second output and the third output not matching the fourth output.

In Example 12, the subject matter of any one of Examples 8-11, wherein: the generating of the comparison comprises: receiving, by each of a plurality of Exclusive OR (XOR) gates of the comparison logic, a corresponding previous bit of the previous data and a corresponding current bit of the current data, the plurality of XOR gates comprising a first XOR gate, a second XOR gate, a third XOR gate, a fourth XOR gate, a fifth XOR gate, a sixth XOR gate, a seventh XOR gate, and an eighth XOR gate; comparing, by each of the plurality of XOR gates, the corresponding previous bit and the corresponding current bit; outputting, by each of the plurality of XOR gates, a first type of bit value in response to the corresponding previous bit not matching the corresponding current bit; and outputting, by each of the plurality of XOR gates, a second type of bit value in response to the corresponding previous bit matching the corresponding current bit; the determining whether the comparison comprises the pattern comprises: receiving, by a first And-Or-Invert (AOI) gate of the adjacent pattern prediction logic, first output of the first XOR gate, second output of the second XOR gate, third output of the third XOR gate, and fourth output of the fourth XOR gate; and receiving, by a second AOI gate of the adjacent pattern prediction logic, fifth output of the fifth XOR gate, sixth output of the sixth XOR gate, seventh output of the seventh XOR gate, and eight output of the eight XOR gate; and the outputting the control signal comprises: receiving, by a NOT AND (NAND) gate of the adjacent pattern prediction logic, output from the first AOI gate and the second AOI gate; generating, by the NAND gate, the control signal in the first state in response to at least one of the first output matching the second output or the third output matching the fourth output; and generating, by the NAND gate, the control signal in the second state in response to the first output not matching the second output and the third output not matching the fourth output.

In Example 13, the subject matter of any one of Examples 8-12, wherein: the generating of the comparison comprises: receiving, by each of a plurality of Exclusive OR (XOR) gates of the comparison logic, a corresponding previous bit of the previous data and a corresponding current bit of the current data, the plurality of XOR gates comprising a first XOR gate, a second XOR gate, a third XOR gate, a fourth XOR gate, and a fifth XOR gate; outputting, by each of the plurality of XOR gates, a first type of bit value in response to the corresponding previous bit not matching the corresponding current bit; and outputting a second type of bit value in response to the corresponding previous bit matching the corresponding current bit; the determining whether the comparison comprises the pattern comprises: receiving, by a first And-Or-Invert (AOI) gate of the adjacent pattern prediction logic, first output of the first XOR gate, second output of the second XOR gate, third output of the third XOR gate, and fourth output of the fourth XOR gate; and receiving, by a second AOI gate of the adjacent pattern prediction logic, second output of the second XOR gate, third output of the third XOR gate, fourth output of the fourth XOR gate, and fifth output of the fifth XOR gate; the outputting of the control signal comprises: receiving, by a third AOI gate of the adjacent pattern prediction logic, output from the first AOI gate and the second AOI gate; and generating, by the third AOI gate, the control signal; the outputting of the control signal in the first state is in response to at least one of: the first output, second output, and third output matching; the second output, the third output, and fourth output matching; or the third output, the fourth output, and the fifth output matching; and the outputting of the control signal in the second state in response to: the first output, second output, and third output not matching; the second output, the third output, and fourth output not matching; and the third output, the fourth output, and the fifth output not matching.

In Example 14, the subject matter of any one of Examples 8-13, wherein the determining whether the comparison comprises the pattern is via two or more gate levels of the adjacent pattern prediction logic.

Example 15 is a computing system comprising: a memory device; a processor coupled to the memory device; and a network card coupled to the processor, the network card comprising: a pre-driver circuit; and a driver circuit coupled to the pre-driver circuit, wherein the pre-driver circuit is to: receive current data to be transmitted on a data bus; store previous data transmitted on the data bus; determine a comparison of the previous data and the current data comprises a pattern predicting transmission of the current data with toggle is more efficient than transmission of the current data without toggle; and invert bits of the current data before transmission in response to determining the comparison comprises the pattern, wherein the driver circuit is to output the current data.

In Example 16, the subject matter of Example 15, wherein: the pre-driver circuit, to determine the comparison, compares a corresponding previous bit of the previous data and a corresponding current bit of the current data; and the pattern comprises the comparison indicating at least two instances of the corresponding previous bit and the corresponding current bit are not equal.

In Example 17, the subject matter of any one of Examples 15-16, wherein the pattern comprises the comparison indicating at least three instances of the corresponding previous bit and the corresponding current bit are not equal.

In Example 18, the subject matter of any one of Examples 15-17, wherein: the pre-driver circuit comprises: a plurality of Exclusive OR (XOR) gates comprising a first XOR gate, a second XOR gate, a third XOR gate, and a fourth XOR gate; and a first And-Or-Invert (AOI) gate coupled to the first XOR gate, the second XOR gate, the third XOR gate, and the fourth XOR gate; each of the plurality of XOR gates, to determine the comparison, is to receive a corresponding previous bit of the previous data and a corresponding current bit of the current data, is to compare the corresponding previous bit and the corresponding current bit, and is to output a first type of bit value in response to the corresponding previous bit not matching the corresponding current bit and output a second type of bit value in response to the corresponding previous bit matching the corresponding current bit; the pre-driver circuit inverting the current data is in response to the AOI gate determining the comparison comprises the pattern of at least one of a first output of the first XOR gate matching a second output of the second XOR gate or a third output of the third XOR gate matching a fourth output of the fourth XOR gate; and the pre-driver circuit not inverting the current data is in response to the AOI gate determining the first output does not match the second output and the third output does not match the fourth output.

In Example 19, the subject matter of any one of Examples 15-18, wherein: the pre-driver circuit comprises: a plurality of Exclusive OR (XOR) gates comprising a first XOR gate, a second XOR gate, a third XOR gate, a fourth XOR gate, a fifth XOR gate, a sixth XOR gate, a seventh XOR gate, and an eighth XOR gate; a first And-Or-Invert (AOI) gate coupled to the first XOR gate, the second XOR gate, the third XOR gate, and the fourth XOR gate; a second AOI gate coupled to the fifth XOR gate, the sixth XOR gate, the seventh XOR gate, and the eighth XOR gate; and a NOT AND (NAND) gate coupled to the first AOI gate and the second AOI gate; and the pre-driver circuit inverting the current data is in response to the NAND gate determining the comparison comprises the pattern of at least one of: first output of the first XOR gate matching second output of the second XOR gate; third output of the third XOR gate matching fourth output of the fourth XOR gate; fifth output of the fifth XOR gate matching sixth output of the sixth XOR gate; or seventh output of the seventh XOR gate matching eighth output of the eighth XOR gate.

In Example 20, the subject matter of any one of Examples 15-19, wherein: the pre-driver circuit comprises: a plurality of Exclusive OR (XOR) gates comprising a first XOR gate, a second XOR gate, a third XOR gate, a fourth XOR gate, and a fifth XOR gate; a first And-Or-Invert (AOI) gate coupled to the first XOR gate, the second XOR gate, the third XOR gate, and the fourth XOR gate; a second AOI gate coupled to the second XOR gate, the third XOR gate, the fourth XOR gate, and the fifth XOR gate; and a third AOI gate coupled to the first AOI gate and the second AOI gate; each of the plurality of XOR gates, to determine the comparison, is to receive a corresponding previous bit of the previous data and a corresponding current bit of the current data, is to compare the corresponding previous bit and the corresponding current bit, and is to output a first type of bit value in response to the corresponding previous bit not matching the corresponding current bit and output a second type of bit value in response to the corresponding previous bit matching the corresponding current bit; the pre-driver circuit inverting the current data is in response to the third AOI gate determining the comparison comprises the pattern of at least one of: first output of the first XOR gate, second output of the second XOR gate, and third output of the third XOR gate matching; the second output of the second XOR gate, the third output of the third XOR gate, and fourth output of the fourth XOR gate matching; or the third output of the third XOR gate, the fourth output of the fourth XOR gate, and fifth output of the fifth XOR gate matching; and the pre-driver circuit not inverting the current data is in response to the third AOI gate determining: the first output, second output, and third output do not match; the second output, the third output, and fourth output do not match; and the third output, the fourth output, and the fifth output do not match.

Example 21 is an apparatus comprising means to perform a method of any one of Examples 8-14.

Example 22 is at least one machine readable medium comprising a plurality of instructions, when executed, to implement a method or realize an apparatus of any one of Examples 8-14.

Example 23 is an apparatus comprising means for performing the method of any one of Examples 8-14.

Example 24 is an apparatus comprising a processor configured to perform the method of any one of Examples 8-14.

Various embodiments can have different combinations of the structural features described above. For instance, all optional features of the computing system described above can also be implemented with respect to the method or process described herein and specifics in the examples can be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments may be described with reference to timestamp validation of components in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a microcontroller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "storing," "receiving," "determining," "outputting," "inverting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. A transmitting component comprising:
    a transmitter; and
    a statistical data bus inversion (DBI) circuit coupled to the transmitter, wherein the statistical DBI circuit is to receive current data to be transmitted on a data bus and is to store previous data transmitted on the data bus, the statistical DBI circuit comprising:
        inverting logic to invert bits of the current data before transmission in response to a control signal in a first state; and
        adjacent pattern prediction logic coupled to the inverting logic, the adjacent pattern prediction logic to:
            receive a difference vector comprising a comparison of the previous data and the current data;
            determine whether the difference vector comprises a pattern predicting transmission of the current data with toggle is more efficient than transmission of the current data without toggle; and
            output the control signal indicating whether the current data is to be transmitted with or without toggle, wherein the control signal in the first state indicates current data is to be transmitted with toggle in response to the pattern being detected by the adjacent pattern prediction logic and the control signal in a second state indicates the current data is to be transmitted without toggle in response to the pattern not being detected by the adjacent pattern prediction logic;
    wherein the difference vector comprises a plurality of bits, each bit indicating whether a corresponding previous bit of the previous data and a corresponding current bit of the current data are equal;
    wherein the statistical DBI circuit comprises a plurality of Exclusive OR (XOR) gates, where each of the plurality of XOR gates is to receive the corresponding previous bit and the corresponding current bit and is to generate the difference vector by outputting a first type of bit value in response to the corresponding previous bit not matching the corresponding current bit and outputting a second type of bit value in response to the corresponding previous bit matching the corresponding current bit; and
    wherein the adjacent pattern prediction logic comprises one or more And-Or-Invert (AOI) gate to receive outputs of XOR gates, and output the control signal in the first state or the second state based on a matching characteristic exhibited by the outputs of the XOR gates.

2. The transmitting component of claim 1, wherein:
    the pattern comprises at least two bits of the difference vector indicating the corresponding previous bit and the corresponding current bit are not equal.

3. The transmitting component of claim 2, wherein the pattern comprises at least three bits of the difference vector indicating the corresponding previous bit and the corresponding current bit are not equal.

4. The transmitting component of claim 1, wherein:
    the statistical DBI circuit comprises a first XOR gate, a second XOR gate, a third XOR gate, and a fourth XOR gate;
    the adjacent pattern prediction logic comprises a first And-Or-Invert (AOI) gate to receive a first output of the first XOR gate, a second output of the second XOR gate, a third output of the third XOR gate, and a fourth output of the fourth XOR gate;
    the adjacent pattern prediction logic is arranged to output the control signal in the first state is in response to at least one of the first output matching the second output or the third output matching the fourth output; and
    the adjacent pattern prediction logic is arranged to output the control signal in the second state in response to the first output not matching the second output and the third output not matching the fourth output.

5. The transmitting component of claim 4, wherein:
    the plurality of XOR gates further comprises a fifth XOR gate, a sixth XOR gate, a seventh XOR gate, and an eighth XOR gate;
    the adjacent pattern prediction logic further comprises a second AOI gate to receive a fifth output of the fifth XOR gate, a sixth output of the sixth XOR gate, a seventh output of the seventh XOR gate, and an eighth output of the eight XOR gates and a NOT AND (NAND) gate to receive outputs from the first AOI gate and the second AOI gate and in response, generate the control signal.

6. The transmitting component of claim 1, wherein:
    the statistical DBI circuit comprises a first XOR gate, a second XOR gate, a third XOR gate, a fourth XOR gate, and a fifth XOR gate;
    the adjacent pattern prediction logic comprises a first And-Or-Invert (AOI) gate, a second AOI gate, and a third AOI gate, wherein:
the first AOI gate receives a first output of the first XOR gate, a second output of the second XOR gate, a third output of the third XOR gate, and a fourth output of the fourth XOR gate;
the second AOI gate receives the second output of the second XOR gate, the third output of the third XOR gate, the fourth output of the fourth XOR gate, and the fifth output of the fifth XOR gate;
the third AOI gate receives outputs from the first AOI gate and the second AOI gate and in response, generates the control signal; and
wherein:
the adjacent pattern prediction logic outputs the control signal in the first state in response to at least one of: the first output, second output, and third output matching; the second output, the third output, and fourth output matching; or the third output, the fourth output, and the fifth output matching; and
the adjacent pattern prediction logic outputs the control signal in the second state in response to: the first output, second output, and third output not matching; the second output, the third output, and fourth output not matching; and the third output, the fourth output, and the fifth output not matching.

7. A method comprising:
generating, by comparison logic of a statistical data bus inversion (DBI) circuit of a transmitting component, a comparison of previous data transmitted on a data bus and current data to be transmitted on the data bus;
determining, by adjacent pattern prediction logic of the statistical DBI circuit, whether the comparison comprises a pattern predicting transmission of the current data with toggle is more efficient than transmission of the current data without toggle;
outputting, by the adjacent pattern prediction logic, a control signal indicating whether the current data is to be transmitted with or without toggle, wherein the control signal in a first state indicates the current data is to be transmitted with toggle in response to the pattern being detected by the adjacent pattern prediction logic, and the control signal in a second state indicates the current data is to be transmitted without toggle in response to the pattern not being detected by the adjacent pattern prediction logic; and
inverting, by inverting logic of the statistical DBI circuit, bits of the current data before transmission in response to the control signal in the first state;
wherein the generating of the comparison comprises:
receiving, by each of a plurality of Exclusive OR (XOR) gates of the comparison logic, a corresponding previous bit of the previous data and a corresponding current bit of the current data;
comparing, by each of the plurality of XOR gates, the corresponding previous bit and the corresponding current bit;
outputting, by each of the plurality of XOR gates, a first type of bit value in response to the corresponding previous bit not matching the corresponding current bit; and
outputting, by each of the plurality of XOR gates, a second type of bit value in response to the corresponding previous bit matching the corresponding current bit;
wherein the determining whether the comparison comprises the pattern comprises receiving, by one or more And-Or-Invert (AOI) gates of the adjacent pattern prediction logic, outputs of the plurality of XOR gates, and selectively match comparing the outputs of the plurality of XOR gates;
wherein the outputting of the control signal in the first state or the second state is in response to a matching characteristic exhibited by the outputs of the XOR gates.

8. The method of claim 7, wherein:
the pattern comprises the comparison indicating at least two instances of the corresponding previous bit and the corresponding current bit are not equal.

9. The method of claim 8, wherein the pattern comprises the comparison indicating at least three instances of the corresponding previous bit and the corresponding current bit are not equal.

10. The method of claim 7, wherein:
receiving, by each of a plurality of Exclusive OR (XOR) gates of the comparison logic, a corresponding previous bit of the previous data and a corresponding current bit of the current data, comprises receiving by a first XOR gate, a second XOR gate, a third XOR gate, and a fourth XOR gate;
receiving, by one or more And-Or-Invert (AOI) gates of the adjacent pattern prediction logic comprises receiving, by a first And-Or-Invert (AOI) gate a first output of the first XOR gate, a second output of the second XOR gate, a third output of the third XOR gate, and a fourth output of the fourth XOR gate;
the outputting of the control signal in the first state is in response to at least one of the first output matching the second output or the third output matching the fourth output; and
the outputting of the control signal in the second state is in response to the first output not matching the second output and the third output not matching the fourth output.

11. The method of claim 7, wherein:
receiving, by each of a plurality of Exclusive OR (XOR) gates of the comparison logic, a corresponding previous bit of the previous data and a corresponding current bit of the current data, comprises receiving by a first XOR gate, a second XOR gate, a third XOR gate, a fourth XOR gate, a fifth XOR gate, a sixth XOR gate, a seventh XOR gate, and an eighth XOR gate;
receiving, by one or more And-Or-Invert (AOI) gates of the adjacent pattern prediction logic comprises:
receiving, by a first And-Or-Invert (AOI) gate, a first output of the first XOR gate, a second output of the second XOR gate, a third output of the third XOR gate, and a fourth output of the fourth XOR gate; and
receiving, by a second AOI gate, a fifth output of the fifth XOR gate, a sixth output of the sixth XOR gate, a seventh output of the seventh XOR gate, and an eighth output of the eighth XOR gate; and
the outputting of the control signal comprises:
receiving, by a NOT AND (NAND) gate of the adjacent pattern prediction logic, outputs from the first AOI gate and the second AOI gate;
generating, by the NAND gate, the control signal in the first state in response to at least one of the first output matching the second output or the third output matching the fourth output; and
generating, by the NAND gate, the control signal in the second state in response to the first output not matching the second output and the third output not matching the fourth output.

12. The method of claim 7, wherein:

receiving, by each of a plurality of Exclusive OR (XOR) gates of the comparison logic, a corresponding previous bit of the previous data and a corresponding current bit of the current data, comprises receiving by a first XOR gate, a second XOR gate, a third XOR gate, a fourth XOR gate, and a fifth XOR gate;

receiving, by one or more And-Or-Invert (AOI) gates of the adjacent pattern prediction logic comprises:

receiving, by a first And-Or-Invert (AOI) gate, a first output of the first XOR gate, a second output of the second XOR gate, a third output of the third XOR gate, and a fourth output of the fourth XOR gate; and receiving, by a second AOI gate, the second output of the second XOR gate, the third output of the third XOR gate, the fourth output of the fourth XOR gate, and a fifth output of the fifth XOR gate; and the outputting of the control signal comprises:

receiving, by a third AOI gate, outputs from the first AOI gate and the second AOI gate; and generating, by the third AOI gate, the control signal;

the outputting of the control signal in the first state is in response to at least one of: the first output, second output, and third output matching; the second output, the third output, and fourth output matching; or the third output, the fourth output, and the fifth output matching; and the outputting of the control signal in the second state in response to: the first output, second output, and third output not matching; the second output, the third output, and fourth output not matching; and the third output, the fourth output, and the fifth output not matching.

13. A computing system comprising:

a memory device;

a processor coupled to the memory device; and a network card coupled to the processor, the network card comprising:

a pre-driver circuit; and a driver circuit coupled to the pre-driver circuit, wherein the pre-driver circuit is to:

receive current data to be transmitted on a data bus;

store previous data transmitted on the data bus;

determine a comparison of the previous data and the current data comprises a pattern predicting transmission of the current data with toggle is more efficient than transmission of the current data without toggle; and invert bits of the current data before transmission in response to determining the comparison comprises the pattern, wherein the driver circuit is to output the current data;

wherein the pre-driver circuit comprises:

a plurality of Exclusive OR (XOR) gates; and one or more And-Or-Invert (AOI) gates coupled to the plurality of XOR gates;

each of the plurality of XOR gates, to determine the comparison, is to receive a corresponding previous bit of the previous data and a corresponding current bit of the current data, is to compare the corresponding previous bit and the corresponding current bit, and is to output a first type of bit value in response to the corresponding previous bit not matching the corresponding current bit and output a second type of bit value in response to the corresponding previous bit matching the corresponding current bit; and wherein the pre-driver circuit inverts or not inverts the current data is in response to the one or more AOI gates determining the comparison comprises the pattern of a matching characteristic exhibited by the outputs of the plurality of XOR gates.

14. The computing system of claim 13, wherein:

the pattern comprises the comparison indicating at least two instances of the corresponding previous bit and the corresponding current bit are not equal.

15. The computing system of claim 14, wherein the pattern comprises the comparison indicating at least three instances of the corresponding previous bit and the corresponding current bit are not equal.

16. The computing system of claim 13, wherein:

the plurality of Exclusive OR (XOR) gates comprises a first XOR gate, a second XOR gate, a third XOR gate, and a fourth XOR gate; and the one or more (AOI) gates comprise a first And-Or-Invert (AOI) gate coupled to the first XOR gate, the second XOR gate, the third XOR gate, and the fourth XOR gate;

the pre-driver circuit inverts the current data is in response to the first AOI gate determining the comparison comprises the pattern of at least one of a first output of the first XOR gate matching a second output of the second XOR gate or a third output of the third XOR gate matching a fourth output of the fourth XOR gate; and the pre-driver circuit not inverts the current data is in response to the first AOI gate determining the first output does not match the second output and the third output does not match the fourth output.

17. The computing system of claim 13, wherein:

the plurality of Exclusive OR (XOR) gates comprises a first XOR gate, a second XOR gate, a third XOR gate, a fourth XOR gate, a fifth XOR gate, a sixth XOR gate, a seventh XOR gate, and an eighth XOR gate;

the one or more And-Or-Invert (AOI) gates comprises:

a first And-Or-Invert (AOI) gate coupled to the first XOR gate, the second XOR gate, the third XOR gate, and the fourth XOR gate; and a second AOI gate coupled to the fifth XOR gate, the sixth XOR gate, the seventh XOR gate, and the eighth XOR gate; and the pre-driver circuit further comprises a NOT AND (NAND) gate coupled to the first AOI gate and the second AOI gate; and the pre-driver circuit inverts the current data is in response to the NAND gate determining the comparison comprises the pattern of at least one of:

first output of the first XOR gate matching second output of the second XOR gate;

third output of the third XOR gate matching fourth output of the fourth XOR gate;

fifth output of the fifth XOR gate matching sixth output of the sixth XOR gate; or seventh output of the seventh XOR gate matching eighth output of the eighth XOR gate.

18. The computing system of claim 13, wherein:

the plurality of Exclusive OR (XOR) gates comprises a first XOR gate, a second XOR gate, a third XOR gate, a fourth XOR gate, and a fifth XOR gate;

the one or more And-Or-Invert (AOI) gates comprise:

a first And-Or-Invert (AOI) gate coupled to the first XOR gate, the second XOR gate, the third XOR gate, and the fourth XOR gate;

a second AOI gate coupled to the second XOR gate, the third XOR gate, the fourth XOR gate, and the fifth XOR gate; and a third AOI gate coupled to the first AOI gate and the second AOI gate;

the pre-driver circuit inverts the current data is in response to the third AOI gate determining the comparison comprises the pattern of at least one of: first output of the first XOR gate, second output of the second XOR gate, and third output of the third XOR gate matching; the second output of the second XOR gate, the third output of the third XOR gate, and fourth output of the fourth XOR gate matching; or the third output of the third XOR gate, the fourth output of the fourth XOR gate, and fifth output of the fifth XOR gate matching; and the pre-driver circuit not inverts the current data is in response to the third AOI gate determining: the first output, second output, and third output do not match; the second output, the third output, and fourth output do not match; and the third output, the fourth output, and the fifth output do not match.

* * * * *